United States Patent
Bergamo

(10) Patent No.: US 11,853,961 B1
(45) Date of Patent: Dec. 26, 2023

(54) CUSTOMIZED NEURAL NETWORK FOR ITEM RECOGNITION

(71) Applicant: AMAZON TECHNOLOGIES, INC., Seattle, WA (US)

(72) Inventor: Alessandro Bergamo, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 92 days.

(21) Appl. No.: 17/444,697

(22) Filed: Aug. 9, 2021

Related U.S. Application Data

(63) Continuation of application No. 15/842,668, filed on Dec. 14, 2017, now Pat. No. 11,087,273.

(51) Int. Cl.
*G06Q 10/087* (2023.01)
*G06V 10/75* (2022.01)
*G06F 18/28* (2023.01)
*G06Q 30/04* (2012.01)
*G06F 16/58* (2019.01)

(52) U.S. Cl.
CPC .......... *G06Q 10/087* (2013.01); *G06F 18/28* (2023.01); *G06V 10/751* (2022.01); *G06F 16/5866* (2019.01); *G06Q 30/04* (2013.01)

(58) Field of Classification Search
CPC .......................... G06Q 10/087; G06V 10/751
See application file for complete search history.

(56) References Cited

U.S. PATENT DOCUMENTS

| | | | | |
|---|---|---|---|---|
| 7,949,568 B2* | 5/2011 | Fano | ................... | G06Q 20/203 705/28 |
| 8,009,864 B2* | 8/2011 | Linaker | .................. | G06V 20/10 382/103 |
| 8,189,855 B2* | 5/2012 | Opalach | .................. | G06F 18/00 382/209 |
| 8,630,924 B2* | 1/2014 | Groenevelt | .......... | G06Q 10/087 283/79 |
| 2007/0179921 A1* | 8/2007 | Zitnick | ............... | G06V 10/757 706/20 |
| 2017/0323376 A1* | 11/2017 | Glaser | .................. | G06Q 20/203 |
| 2017/0352143 A1* | 12/2017 | Kompalli | .............. | B64C 39/024 |
| 2018/0082179 A1* | 3/2018 | Gredilla | ................... | G06N 7/01 |
| 2019/0026593 A1* | 1/2019 | Sawada | .................. | G06V 20/52 |
| 2019/0228457 A1* | 7/2019 | Wu | ........................ | G06V 40/28 |
| 2019/0246904 A1* | 8/2019 | Kim | ....................... | G06T 7/0014 |

* cited by examiner

*Primary Examiner* — Florian M Zeender
*Assistant Examiner* — Vanessa Deligi
(74) *Attorney, Agent, or Firm* — Lindauer Law, PLLC

(57) ABSTRACT

A camera acquires an image of an item involved in an interaction, such as the item being picked or placed on a shelf by a user. The item depicted in the image is identified via item recognition using a customized neural network that uses previously trained subnetworks for a set of candidate items. The candidate items are determined based on items near a user location, items associated with a user cart, items in a shopping list or wish list associated with the user, or items otherwise associated with the user. Each previously trained subnetwork for a candidate item includes one or more reference images and corresponding reference feature data. The customized neural network uses a matching and inference network to test the image against the candidate items and provide comparison data indicative of a similarity between the item depicted in the image and one of the candidate items.

15 Claims, 8 Drawing Sheets

CUSTOMIZED NEURAL NETWORK FOR ITEM RECOGNITION

PRIORITY

This application is a continuation of, and claims priority to, U.S. patent application Ser. No. 15/842,668, filed on Dec. 14, 2017, entitled "ITEM RECOGNITION SYSTEM USING REFERENCE IMAGES", which is hereby incorporated by reference in its entirety.

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor the movement of inventory within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
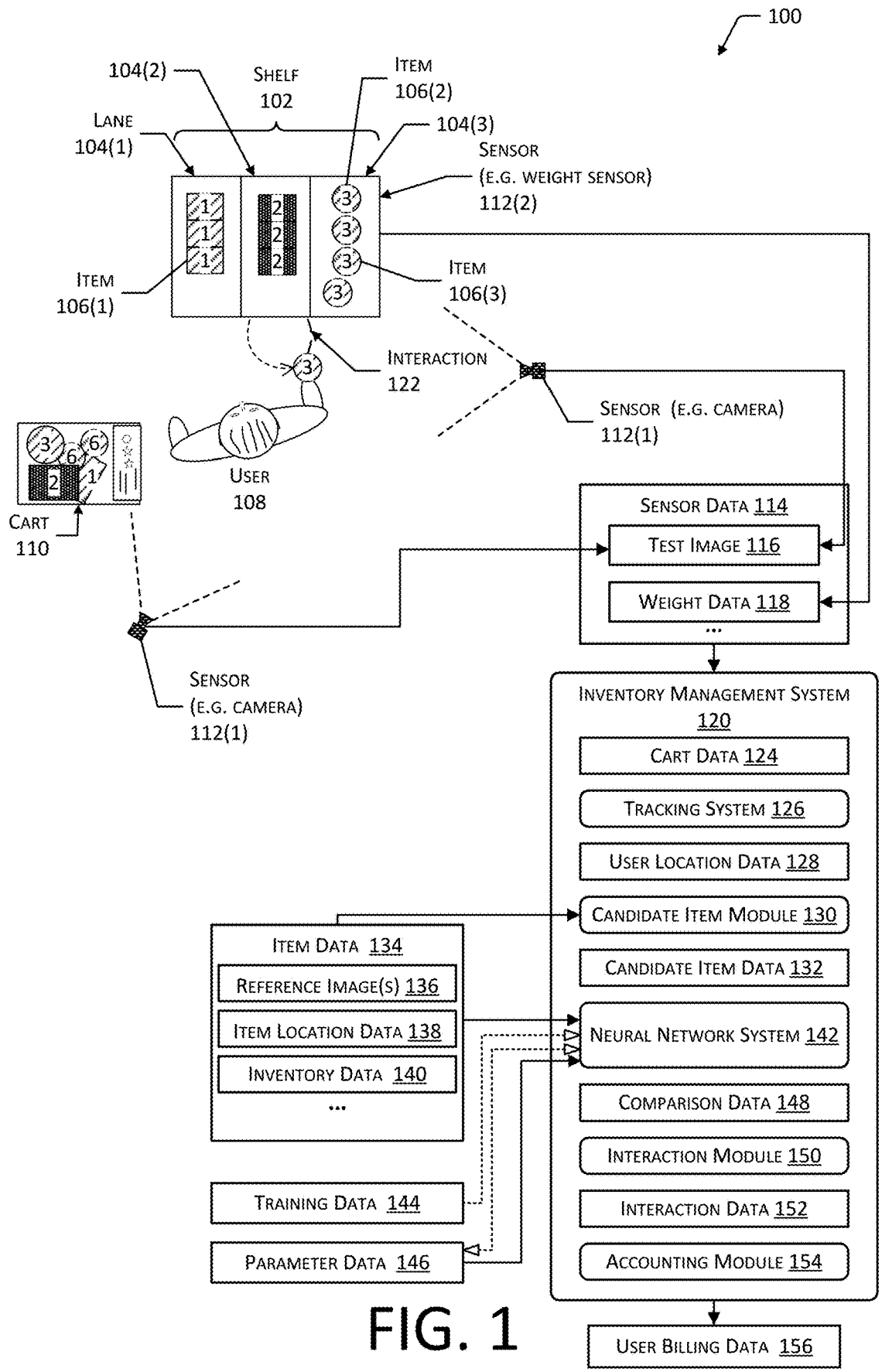
FIG. 1 illustrates a system that determines the type of item a user is interacting with based on a test image that is compared to reference images in a candidate set of types of items using a neural network, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

A materials handling facility (facility) or other setting may utilize fixtures that provide inventory locations used to stow or otherwise hold items. For example, the fixture may comprise a shelf with inventory locations comprising different lanes, within which are stowed different types of items. The fixtures or the environment around the fixtures may include one or more sensors that generate sensor data. These sensors may include cameras, weight sensors, radio receivers, and so forth. Different types of sensors produce different kinds of sensor data. For example, the cameras generate image data, the weight sensors generate weight data, the radio receivers may provide received data, and so forth.

The sensor data may be used by an inventory management system to determine interaction data such as whether something has been placed at the inventory location or picked from the inventory location, placed in or removed from a user's cart, and so forth. The interaction data may include information about the type of item involved, user account identifier indicative of the person performing the interaction, and so forth.

Image based determination of the interaction data is advantageous for several reasons. For example, the installation of cameras to an existing facility may be less expensive than installing sensors at the fixtures. In another example, image based systems may be less prone to interference or noisy signals than other types of sensors. With an image based determination, a computer system attempts to determine what item has been picked, placed, or otherwise interacted with.

Image based systems have traditionally exhibited some disadvantages. For example, image based determination of an item is operationally and computationally expensive. Traditional systems involve extensive creation of images of each individual item in many different poses, under carefully controlled lighting conditions, and so forth. For example, a special computer controlled image capture rig may be used to acquire hundreds or thousands of images of the item. Subsequently, those images would be stored in a datastore and used for later comparison, resulting in significant ongoing memory demands. Because of these and other considerations, adding a new item to inventory may be time consuming and expensive. During operation, significant processing demands are experienced while searching and comparing this large store of images to find a match.

Described in this disclosure are techniques and systems designated to dynamically instantiate a neural network that is used to compare a test image obtained by a camera during an interaction with reference images of one or more candidate items. The neural network is operated in two distinct modes: a training mode or a normal mode. During training, the configuration of the nodes within the neural network may be fixed, while parameters in the neural network may change during training. Once trained, during subsequent operational use in the normal mode, the neural network is instantiated dynamically as described below.

The neural network comprises three parts: feature networks, matching networks, and inference networks. Feature networks are used to process images to produce feature data that is representative of those images. In one implementation the feature networks may utilize a convolutional neural network to produce feature data. The resulting feature data is then passed to matching networks that determine if there is a match between one or more of the input feature data. In one implementation the matching network may implement a multi-layer perceptron architecture. The matching networks produce matching data that is then passed to an inference network. The inference network uses the matching data to generate comparison data that is indicative of whether there is a match between one or more of the input images.

During training, the neural network may be instantiated with a fixed configuration of the nodes, or graph, and is trained jointly end-to-end as a whole in a semi-supervised fashion. During training, training data is used that includes labeled data and unlabeled data. The labeled data comprises images that are known to depict the same type of item, while unlabeled data may comprise images that may or may not include the same type of item or other types of items. The training data may include images that may be obtained using different techniques. For example, images in the training data may be acquired using a motion capture rig, freehand, and so forth. During training, different permutations of images of different types of items may be used as input. Training may utilize techniques such as backpropagation to modify the parameters such as weights at different nodes in all of the parts of the neural network.

An iteration of training that includes the forward propagation of data through the neural network and the back-propagation of changes to parameters in the network may be referred to as an epoch. The architecture of the network implements a "Siamese" architecture in which parameters, such as weights, are shared between functions and used in conjunction with a common cost module. At the beginning and the end of each epoch, the parameters between similar portions of the network are processed such that they are the same. For example, at the beginning of an epoch, the parameters of all the feature networks are the same. At the end of the epoch, the parameters of all the feature networks are again the same, however, they may differ in value from the beginning of the epoch. In another example, at the beginning of an epoch, the parameters of all the matching networks are again the same. Likewise, at the end of the epoch, the parameters of the matching networks are again the same, albeit possibly different from those values at the beginning.

The neural network may be trained until a sufficient level of accuracy is achieved and prior to the neural network entering an overfitted state. Once trained the neural network is able to determine if a test image depicts a type of item that is the same as a type of item depicted in one of the reference images. For example, the neural network is able to determine if the can of soup in the test image obtained with a first pose is the same can of soup depicted in a reference image that has a second pose different from the first. The neural network is not trained to determine if the test image is identical to the reference images.

Once trained, the parameters for parts of the neural network are now known. For example, parameters for the weights involved in operation of a feature network are now known, as are the weights involved in operation of a matching network. Because of the use of the Siamese architecture, the configuration of the feature networks and the matching networks are fixed, and they may be subsequently dynamically instantiated during normal use.

Traditional neural network designs train and then operate the network in a particular configuration or graph that remains fixed between training and operation. For example, the traditional neural network may be configured to accept 100 images and produce a single output. A fixed configuration such as this leads to significant inefficiencies. For example, what if the situation only calls for the comparison of 10 images? What if the situation calls for the comparison of 200 images? Trying to address these situations in a neural network of fixed configuration is inefficient and may result in increased consumption of resources such as memory, processor time, network bandwidth, and so forth.

As described in this disclosure, during normal use, the parameters determined during training are used to instantiate a neural network with a configuration or graph that is tailored to the specific situation at hand. The Siamese architecture employed during training allows for the parts of the neural network, such as feature networks and matching networks, to operate independently of one another. This ability for parts to operate independently allows for the neural network to be dynamically configured during operational use.

The dynamic configuration may be determined based on information from candidate item data that is indicative of candidate items that could possibly be involved in an interaction. Various techniques may be used to determine the candidate item data. For example, given a location of a user, the candidate item data may be indicative of those items that are within a maximum distance of that location. In another example, the candidate item data may be indicative of those items that were previously determined as being within a cart associated with the user, that have been previously interacted with by the user, and so forth. In some implementations, the candidate item data may be determined based at least in part on data from other sensors. For example, weight sensors at an inventory location may indicate that something has been taken from, or added to, that inventory location. In this example, based on this weight change, the candidate item data may include data indicative of the types of items that are associated with that inventory location.

During operational use, given candidate item data that is indicative of a particular set of candidate items, a matching network may be instantiated for each type of item in the candidate item data, and a feature network is instantiated for each reference image of each type of item. Unlike other approaches, the system described allows for items to be added to or removed from the inventory of the facility without requiring retraining of the neural network. This further reduces the cost of using the system by avoiding costly retraining, redeployment of new parameters, and so forth.

To further improve performance and reduce memory and computational demands, the images described in this disclosure may comprise images that have been previously cropped or selected to depict only an item or portion thereof. For example, pre-processing techniques may be applied to reference images, test images, and so forth to detect an item in an image and crop or otherwise identify that portion of the image that includes the item. Other portions of the image, such as of the user's body, background, fixtures, and so forth may be excluded from processing or removed via cropping.

By using the neural network system, performance of the system is improved by reducing the computational complexity required to determine with an automated system what items a user has picked or returned. As items are picked and returned, the inventory management system is able to track what items are in the custody of the user, determine if an item is returned to a proper location on the shelf, and so forth. User billing data for items that are in the custody of the user may be generated, such as an invoice. The user billing data may be generated with little or no human intervention, further reducing overall costs associated with the facility. Inventory data indicative of quantity on hand at particular inventory locations may be accurately maintained, reducing costs associated with inventory management.

Illustrative System

FIG. 1 illustrates a system 100 to determine interaction data that is indicative of an interaction of a user with an inventory location, such as a lane on a shelf, according to some implementations. A shelf 102 may include one or more lanes 104. The lanes 104 are an area upon the shelf 102 that is associated with a particular type of item 106. For example, the shelf 102 depicted here has three lanes 104(1), 104(2), and 104(3). Lane 104(1) may be associated with storing some quantity of item 106(1) such as Brand Z soup, while lane 104(2) may be associated with storing some quantity of item 106(2) such as Brand X soup, and lane 104(3) may be associated with storing some quantity of item 106(3) such as Brand Y soup. In other implementations, instead of or in addition to lanes 104, hangers, bins, or other devices may be used to stow the items 106.

A user 108 may interact with the lanes 104 at the shelf 102. For example, the user 108 may pick an item 106(1) from the lane 104(1) and take custody of the item 106(1). For example, the user 108 may place the item 106(1) into a cart 110, hold the item 106(1) while inspecting it, and so forth. The cart 110 may be associated with the user 108 or that user's 108 user account. The user 108 may decide, for any number of reasons, to return the item 106(1) to the shelf 102. The user 108 may place the item 106(1) into one of the lanes 104 on the shelf 102, or the lanes 104 of another shelf 102 (not shown). If the item 106 is returned to the lane 104 that is associated with that type of item 106, the lane 104 may be described as a tidy lane. Continuing the example, the user 108 may return item 106(1) to lane 104(1).

A tidy lane may comprise a lane 104 for which only the one or more types of items 106 associated with that lane 104 are present. In comparison, an untidy lane may comprise a lane 104 that is associated with one or more types of items 106, but at which an item 106 of another type of item has been placed.

The tidiness of a lane 104 may not necessarily be indicative of the arrangement or neatness on the shelf 102. For example, the lane 104(1) storing boxes of soup may have individual boxes of soup that are more neatly arranged than the lane 104(3) storing cans of soup, but both may be deemed to be tidy lanes because they contain only those types of items 106 that are associated with their respective lanes 104.

The facility may include one or more sensors 112 that are used to acquire sensor data 114. The sensors 112 may include one or more cameras 112(1). The cameras 112(1) may be positioned to gather information about the shelf 102 or other type of inventory location. The camera 112(1) may have a field of view (FOV) within which image data may be acquired. The FOV includes at least a portion of the shelf 102 or other type of inventory location. For example, a camera 112(1) may acquire sensor data 114 such as a test image 116 of the lanes 104(1)-(3). In some implementations, each lane 104 or group of lanes 104 may have a respective camera 112(1) having a FOV that looks at a particular lane 104 or group of lanes 104. The test image 116 may comprise one or more still images. In some implementations, the still images may be obtained from video.

The shelf 102 may be equipped with other types of sensors 112 that produce sensor data 114. For example, the shelf 102 may include four weight sensors 112(2), with each weight sensor 112(2) arranged proximate to a corner of the shelf 102. The weight sensors 112(2) produce weight data 118. In another example, the weight in each lane 104 may be measured by an individual weight sensor 112(2). Other types of sensors 112 may be present at or near the shelf 102 instead of or in addition to the weight sensors 112(2). The sensors 112 may include a radio receiver 112 connected to an antenna located proximate to a front of a lane 104. The items 106 may be marked with radio frequency identification (RFID) tags, near field communication (NFC) tags, radio frequency beacons, and so forth. As a tagged item 106 passes close to the antenna, a radio signal emitted by the tag may be acquired by the antenna and detected by the radio receiver 112.

In other implementations, the sensors 112 present at or near the inventory location may include proximity sensors 112 at each lane 104 to determine presence of a hand of the user 108. In another example, the facility may utilize a smart floor system with receivers in the fixtures that allow for the identification of a user 108 and the determination of which inventory location or portion thereof that the user 108 is interacting with.

An inventory management system 120 may use the sensor data 114 during operation. The inventory management system 120 may maintain cart data 124. The cart data 124 may comprise information indicative of one or more of the types of items, quantity of each type of item, and so forth that are in the custody of the user 108. For example, the cart data 124 may include a list of those items 106 that are in the cart 110 being used by the user 108. As the user 108 adds or removes items 106 from the cart 110, the cart data 124 may be updated.

A tracking system 126 provides information such as user location data 128. The user location data 128 may specify coordinates indicative of where the user 108 is located within the facility. The tracking system 126 may utilize one or more techniques, such as image based tracking using image data obtained from the cameras 112(1). In some implementations, the user location data 128 may be indicative of the location of the cart 110 or another object that is associated with the user 108. For example, the user location data 128 may be based on tracking a device carried by the user 108, such as a smart phone, or a transmitter on the cart 110.

A candidate item module 130 generates candidate item data 132. The candidate item data 132 comprises information indicative of a set of one or more types of items 106 that may be involved in an interaction 122. During operation, the candidate item module 130 may use item data 134. The item data 134 provides information about the items 106 that are stowed in the facility. For example, the item data 134 may comprise one or more of reference images 136 of the item 106, item location data 138, inventory data 140, and so forth. The reference images 136 may comprise one or more images of a sample of a particular type of item. The images may be obtained with the item 106 in different poses, under varying lighting conditions, and so forth. A relatively small number of reference images 136 may be used during operation. In one implementation, the number of reference images 136 retrieved for a particular type of item may be fewer than twenty. For example, the reference images 136 may comprise three images of each type of item 106, with those three images taken from different points-of-view with respect to the item 106.

The item location data 138 may include one or more inventory location identifiers (IDs). The inventory location ID is indicative of a particular area or volume of an inventory location such as a shelf 102 that is designated for stowage of the type of item 106. For example, a single shelf 102 may have several lanes 104, each with a different inventory location ID. Each of the different inventory location IDs may be associated with a lane 104 having a particular area on the shelf 102 designated for storage of a particular type of item 106. A single type of item 106 may be associated with a particular inventory location ID, a plurality of inventory location IDs may be associated with the single type of item 106, more than one type of item 106 may be associated with the particular inventory location ID, and so forth.

The inventory data 140 may comprise information such as quantity data indicative of a quantity on hand at a particular inventory location, specify restocking levels, and so forth. The quantity data may comprise a count or value indicative of a number of items 106. The count may be a measured or an estimated value. The quantity data may be associated with a particular inventory location ID, for an entire facility, and so forth. For example, the same type of item 106 may be stored at different shelves 104 within the facility. The quantity data may indicate the quantity on hand for each of the different inventory locations.

The candidate item module 130 may use one or more techniques to determine the candidate item data 132. A first technique may determine those types of item 106 that are within a threshold distance of the user 108. For example, the candidate item module 130 may use the user location data 128 and the item data 134 to determine which types of items 106 are within a distance of 1.5 meters of the user 108 at a given time. If the cart 110 is within this threshold distance, the types of items indicated by the cart data 124 may be included in the candidate item data 132. In another example, the types of items indicated by the cart data 124 may be included in the candidate item data 132 regardless of location of the user 108 or cart 110. A second technique may determine those types of items 106 that the user 108 is likely to have interacted with. Previously acquired data about interactions associated with the user account for that user 108 may be accessed and used to predict what types of items 106 that particular user 108 may interact with. For example, previous purchase history may be used to determine the top three favorite soups that the user 108 purchases on Tuesdays. A third technique may include types of items that have been previously added to a shopping list, wish list, or otherwise have been indicated by the user 108 as being an item 106 they would potentially purchase. These techniques may be used alone, or in combination with one another. For example, the candidate item module 130 may comprise those types of items 106 that are within a threshold distance of the user 108 and that have been previously purchased by the user 108.

The candidate item module 130 may determine the candidate item data 132 based at least in part on other data, such as the type of interaction. For example, during a return or place interaction in which an item 106 is placed onto the shelf 102, the candidate item module 130 may use the cart data 124 as the candidate item data 132. In comparison, during a pick interaction in which an item 106 is removed from the shelf 102, the cart data 124 may not be included in the candidate item data 132 while types of items stowed at inventory locations may be included. The type of interaction may be based on sensor data 114. For example, image data obtained from cameras 112(1) may be processed to determine if an interaction is a pick or a place. In another example, weight data 118 may be used to determine if the user 108 is adding or removing items 106 from an inventory location.

The candidate item data 132 is a subset of the items 106 that are stowed at the facility. For example, the facility may be used to store 10,000 different types of items, while the candidate item data 132 may include 5 different types of items.

The inventory management system 120 utilizes a neural network system 142. The neural network system 142 functions in one of two different modes: training and normal. During training, the neural network system 142 may utilize training data 144 to determine parameter data 146 for a neural network that produces as output comparison data 148. The comparison data 148 may be indicative of whether a test image 116 depicts the same type of item as one of the reference images 136.

The training data 144 may comprise labeled and unlabeled data. For example, the training data 144 may include a subset of the reference images 136 and data indicating the type of item that those reference images 136 represent. In some implementations, the labelling may be that the images are representative of the same type of item, but may not necessarily comprise information identifying the particular type of item. For example, images in the training data 144 may have metadata that indicates they are images of the same type of item. However, the metadata may not include information such as a stock keeping unit, universal product code (UPC) number, and so forth. The training data 144 may also include images of items 106 that are not included in the item data 134.

In this illustration, data that is used only during training is indicated with a dotted (broken) line. Solid lines indicate data that is used during the training mode and the normal mode of operation. For example, the training data 144 is used during the training mode of the neural network system 142. Once trained, the training data 144 is not used during the normal mode of the neural network system 142.

The parameter data 146 comprises information used to configure at least parts of the neural network during operation. For example, the parameter data 146 may comprise weight values for particular nodes in the neural network. As mentioned above, during training of the neural network in the neural network system 142, the parameter data 146 may change. For example, the weights of specific nodes, threshold values, and so forth that affect operation of the neural network may change during training. Once training is complete, the parameters in the parameter data 146 may be used during normal operation without further modification.

The neural network in the neural network system 142 comprises three parts: feature networks, matching networks, and an inference network. A feature network is used to process an image and produce feature data that is representative of an image. In one implementation the feature network may utilize a convolutional neural network with a residual-network architecture.

The resulting feature data is then passed to matching networks that determine if there is a match between one or more of the input feature data and feature data of the test image 116. In one implementation the matching network may implement a multi-layer perceptron architecture. The matching networks produce matching data that is then passed to an inference network. The inference network uses the matching data to generate comparison data that is indicative of whether there is a match between one or more of the input images.

During training, the neural network system 142 instantiates a neural network with a predetermined configuration of the nodes, or graph, and is trained jointly end-to-end as a whole in a semi-supervised fashion. As described below in more detail, during training parameters may be shared between respective parts using a Siamese architecture.

During normal use, the neural network system 142 instantiates a neural network based at least in part on the candidate item data 132 and generates comparison data 148. For example, the number of matching networks instantiated may be based on a count of reference images 136 associated with the different types of items in the candidate item data 132. Continuing the example, the number of matching networks instantiated may comprise a count of the different types of items in the candidate item data 132. As a result, the configuration or graph of the neural network instantiated to process a first test image 116 may be different from that used to process a second test image 116. Operation of the neural network system 142 is described in more detail below.

The comparison data 148 provided by the neural network system 142 may be used by an interaction module 150 to determine interaction data 152. The interaction data 152 comprises information that characterizes an interaction 122 with an inventory location. For example, the interaction data 152 may indicate that a place of an item 106 has occurred at a particular inventory location, such as lane 104(2). The interaction data 152 may include one or more of a timestamp as to when the interaction 122 occurred, a location identifier indicative of the inventory location, the type of interaction such as a place or pick, an item identifier that is indicative of the particular type of item 106, a user identifier that is indicative of the particular user 108 that was involved in the interaction 122, a confidence value indicative of a likelihood that the interaction data 152 is correct, and so forth.

The interaction data 152 may subsequently be used by other modules, such as an accounting module 154. The accounting module 154 may use the interaction data 152 to generate information such as user billing data 156, the inventory data 140, and so forth.

The user billing data 156 comprises information indicative of charges that accrue with respect to a particular user identifier, user account, group of user accounts, and so forth. For example, user billing data 156 may be generated that comprises a bill or invoice for the items 106 that have been taken into the custody of the user 108 as indicated by the interaction data 152. Continuing the example, as the user 108 leaves the facility with their cart 110, a list and cost associated with purchase for those items 106 as indicated in the cart data 124 may be determined, taxes or other fees assessed, and that information included in the user billing data 156. In some implementations, a financial account associated with the user 108(1) may be debited based on the user billing data 156. For example, the invoice total may be charged against a credit card account or bank account.

Likewise, the interaction data 152 may be used to update the inventory data 140. For example, if the interaction data 152 depicts a pick of the type of item 106(1) stowed at the lane 104(1), the inventory data 140 may be updated to include information that is representative of the change of quantity on hand at that lane 104(1).

By using the techniques and systems described in this disclosure, the inventory management system 120 is able to more efficiently operate. The use of the neural network system 142 with the dynamic instantiation reduces the costs associated with adding and removing types of items 106 to the system, while significantly reducing the computational costs associated with generating interaction data 152 using images obtained from cameras 112(1). Additionally, overall accuracy of the comparison data 148 is improved while also reducing the latency involved in the determination of the comparison data 148.

Figure 2:
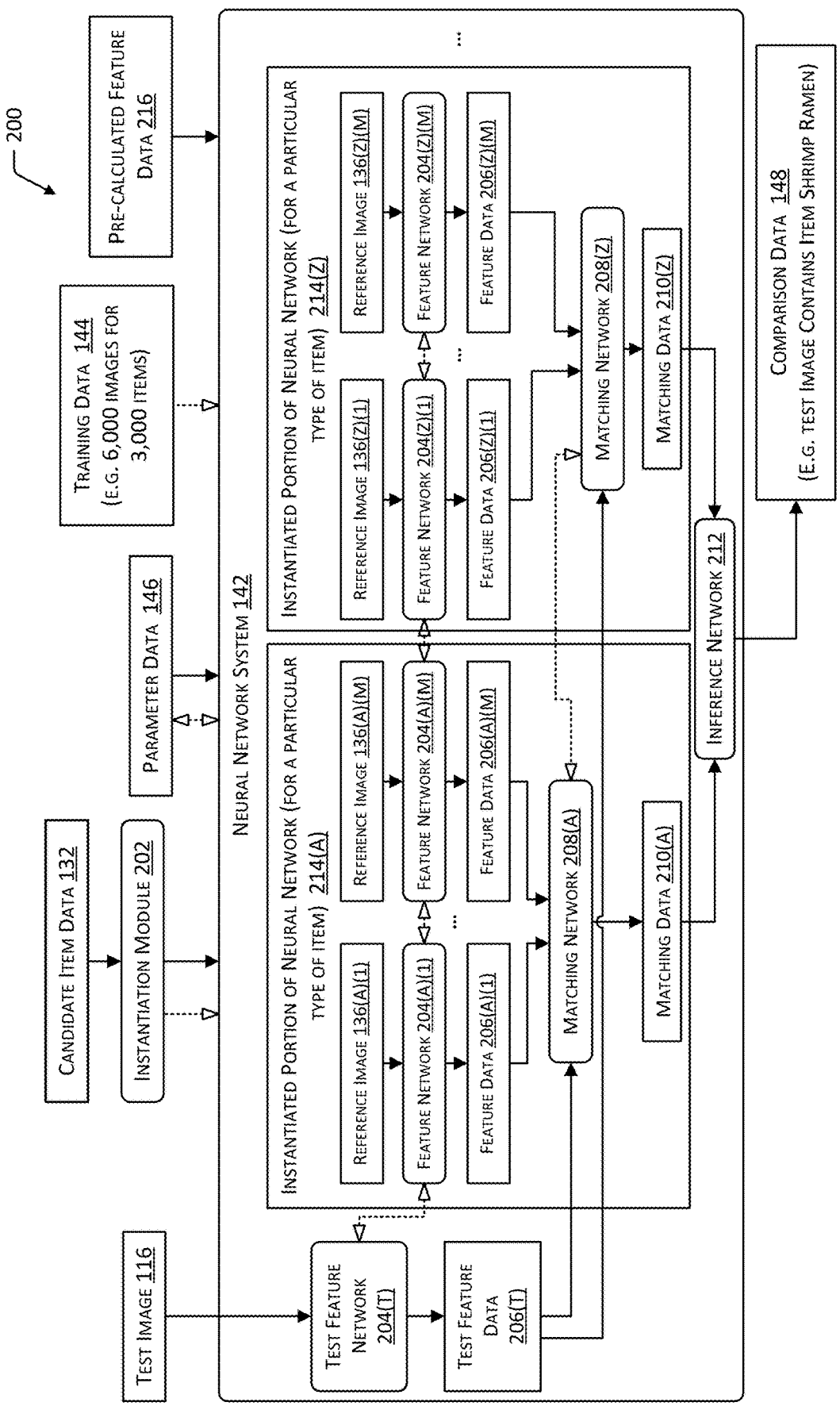
FIG. 2 illustrates a block diagram of a neural network system used to determine if there is a match in the type of item depicted in a test image and one or more of the reference images, according to some implementations.

FIG. 2 illustrates a block diagram 200 of the neural network system 142 used to determine if there is a match in the type of item depicted in a test image and one or more of the reference images, according to some implementations.

As described above, the neural network system 142 may be operated in two distinct modes: a training mode or a normal mode. In this illustration, data that is only used during the training mode is indicated with a dotted (broken) line. Solid lines indicate data that is used during the training mode and the normal mode. For example, while in the training mode, the training data 144 is used, and changes may be made to the parameter data 146. In comparison, in the normal mode, the training data 144 is not used and the parameter data 146 is read but not changed.

An instantiation module 202 instantiates a particular configuration of the neural network system 142. In the training mode, the instantiation module 202 establishes a predetermined configuration or graph. For example, the predetermined configuration may be able to process reference images 136 associated with 50 different types of items. The predetermined configuration may be based on the available computing resources, such as memory, processor availability, processor type, and so forth.

In the normal mode, the instantiation module 202 dynamically instantiates the configuration or graph of the neural network based at least in part on the candidate item data 132. For example, the graph of the neural network in the normal mode may be smaller than that used in the training mode. This dynamic instantiation is discussed in more detail below.

Instantiation may include the configuration and provisioning of a neural network for operation. For example, instantiation may involve a computer processor executing commands to establish interconnections between nodes in the neural network, initialize parameters for those nodes, and so forth. In some implementations, instantiation may involve the configuration of the network for execution on one or more specialized processors. For example, the instantiation may include the allocation of graphics processing units (GPUs), configuration of the GPUs, and so forth in preparation for utilizing the neural network. In another example, the instantiation may include the configuration of a field-programmable gate array (FPGA) or other hardware in preparation for utilizing the neural network.

The neural network system 142 includes several parts or subnetworks including feature networks 204 that produce feature data 206, matching networks 208 that compare the feature data 206 and produce matching data 210, and an inference network 212 that uses the matching data 210 to determine the comparison data 148.

The instantiation module 202 instantiates a plurality of feature networks 204. One feature network 204 may be instantiated for each reference image 136 that is being processed by the neural network. Each feature network 204 may comprise a convolutional neural network (CNN). The CNN may be implemented using a residual-network (resnet) architecture. The CNN may have at least ten layers. For example, the feature network 204 may comprise a CNN with 50 layers. The loss layer of the CNN may utilize the Softmax function, contrastive loss function, and so forth. The residual-network architecture allows processing of an input value by a weight layer, while also passing the input value to a subsequent layer in the neural network. In other implementations, the feature networks 204 may use other techniques such as a recurrent neural network (RNN). For example, the feature networks 204 may use RNNs that implement uni-dimensional or multi-dimensional techniques. In one implementation, the feature data 206 may comprise a vector with 2048 dimensions, however it is understood that the feature data 206 may exhibit a different number of dimensions.

During training, the feature network 204 operates in a "Siamese" or lateral sharing architecture in which functions $G_w$ that comprise the nodes in the of the neural network share the same set of parameters W and use a common cost module. For example, the gradients produced during operation for all of the reference images 136 may be averaged together and then subsequently used. The output from the functions that comprise the nodes in the feature network 204 is then passed to a loss module. In some implementations, the output of the common cost module may be the distance between the function outputs. The parameter W may then be updated using stochastic gradient descent. By using this lateral sharing architecture, memory requirements are significantly reduced during training. For example, by averaging the gradients the memory requirements are reduced such that a single GPU is able to perform the calculation during the training mode, allowing for more efficient operation of the feature network 204. The parameters, such as W, used by the feature network 204 are the feature network parameters.

The instantiation module 202 may instantiate a matching network 208 for each type of item that is being processed. The feature data 206 for reference images 136 that are associated with a particular type of item is provided to a particular matching network 208.

The matching network 208 may comprise a multi-layer perceptron (MLP) architecture. The MLP may comprise a feedforward artificial neural network with a number of input nodes. In some implementations, a separate input node is provided for each dimension of the feature data 206. For example, if each of the feature data 206 comprises 2048 dimensions, and there are two feature networks 204(1) and 204(2) each providing feature data 206(1) and 206(2) to the matching network 208, the matching network 208 may have 4096 input nodes. The matching network 208 may also utilize the Siamese or lateral sharing architecture, sharing parameters between nodes in the same layer as other matching networks 208. The output from the matching network 208 is scalar matching data 210.

In one implementation, the MLP may compute:

$$g = \max_{i=1\ldots M} W1\rho(W0(|f_i - t|) + b0) + b1$$

where t is a feature from the test feature data 206, $f_i$ is the feature from the i-th reference image 136, and W0, W1, b0, b1 are the matching network parameters of the MLP.

Equation 1

The instantiation module 202 may instantiate the inference network 212 that uses the matching data 210 to generate the comparison data 148. For example, the comparison data 148 may comprise data that indicates that an item 106 depicted in the test image 116 is deemed to be the same type of item as that which is associated with and depicted in one of the reference images 136.

In one implementation, the inference network 212 may compute:

$$O = W2\left[g_A, \max_{j=B\ldots Z} g_j\right] + b2$$

where $g_j$ is the matching data 210 for the item j, and W2 and b2 are parameters of the inference network 212.

Equation 2

The parameters W of the matching network 208 and the inference network 212 may be initialized with a truncated Gaussian function with zero mean and 0.1 of standard deviation. The b parameters may be initialized with a constant equal to 0.1. In some implementations, the inference network 212 may be optimized by adaptively inferring different learning rates for each variable based on their historical magnitude. For example, the learning rate may be initialized to 0.001.

In the training mode, the instantiation module 202 instantiates the neural network in the predetermined configuration. The nodes in the various subnetworks such as the feature networks 204 and the matching networks 208 are initialized. In some implementations where the network is being retrained or trained using additional training data 144, the parameter data 146 may be accessed and used to initialize the nodes. During training, the neural network operates "end-to-end", with a test image 116 and reference images 136 provided as input, the feature networks 204 generate the feature data 206 which is then sent to the matching networks 208 that in turn produce matching data 210 that is provided to the inference network 212.

As described above, the training data 144 may include labeled and unlabeled data. The set of training data 144 may be relatively small. For example, the training data 144 may comprise 6,000 images, two different images for each of 3,000 different types of items. In some implementations the training data 144 may be augmented using various synthetic transformation techniques. For example, an original image of an item 106 may be modified to change one or more colors, apply a perspective distortion, change contrast, rescale the item, rotate the image, and so forth to provide a synthetically transformed image of the item. This synthetically transformed image may then be used for training.

An iteration of training of the neural network that includes the forward propagation of data through the neural network and the backpropagation of changes to parameters in the network may be referred to as an epoch.

At the beginning and the end of each epoch, the parameters between similar portions of the network are processed such that they are the same. For example, at the beginning of an epoch, the parameters of all the feature networks are the same. At the end of the epoch, the parameters of all the feature networks 204 are again the same, however, they may differ in value from the beginning of the epoch. In another example, at the beginning of an epoch, the parameters of all the matching networks 208 are again the same. Likewise, at the end of the epoch, the parameters of the matching networks 208 are again the same, albeit possibly different from those values at the beginning.

Once the neural network has been trained, the parameter data 146 is stored. For example, the parameter data 146 may comprise the weights of the nodes in the feature network 204, values of W0, W1, B0, and B1 for the matching networks 208, values of W2 and b2 for the inference network 212, and so forth.

During normal operation, the instantiation module 202 uses information from the candidate item data 132 to determine how many instantiated portions of the neural network 214 for a particular type of item are to be implemented. For example, the number of feature networks 204 to be instantiated is based on the total number of reference images 136 to be processed, plus one feature network 204 for the test image 116. Likewise, the number of matching networks 208 instantiated is based on the number of different types of items in the candidate item data 132. One matching network 208 may be instantiated for each type of item in the candidate item data 132. The instantiation module 202 may also establish the interconnection between the parts of the neural network, such that feature networks 204 that are processing the different reference images of the same type of item provide their respective feature data 206 to the particular matching network 208 designated for use with that type of item.

During the instantiation, each of the feature networks 204 exhibit the same parameters as provided for in the parameter data 146. Likewise, each of the matching networks 208 exhibit the same parameters as provided for in the parameter data 146.

So long as at least those portions of the parameter data 146 that are associated with the feature networks 204 remain unchanged, in some implementations reference images 136 may be processed in advance, and the resulting pre-calculated feature data 216 stored. For example, reference image 136(1773) may be processed using the feature network 204 to produce feature data 206(1773). During operation in normal mode, the neural network may retrieve the pre-calculated feature data 216 instead of instantiating feature networks 204 for the reference images 136. Continuing the example, at a later time, the candidate item data 132 includes a type of item that is represented by reference image 136(1773). During normal operation, instead of instantiating a feature network 204(1773) to produce the feature data 206(1773), the instantiation module 202 may instantiate the respective matching networks 208 and inference network 212, and configure the neural network to utilize the previously stored pre-calculated feature data 216. By utilizing this pre-processing, the computational resources associated with operation of the neural network system 142 are reduced, power consumption is reduced, the system produces comparison data 148 in less time, and so forth.

Figure 3:
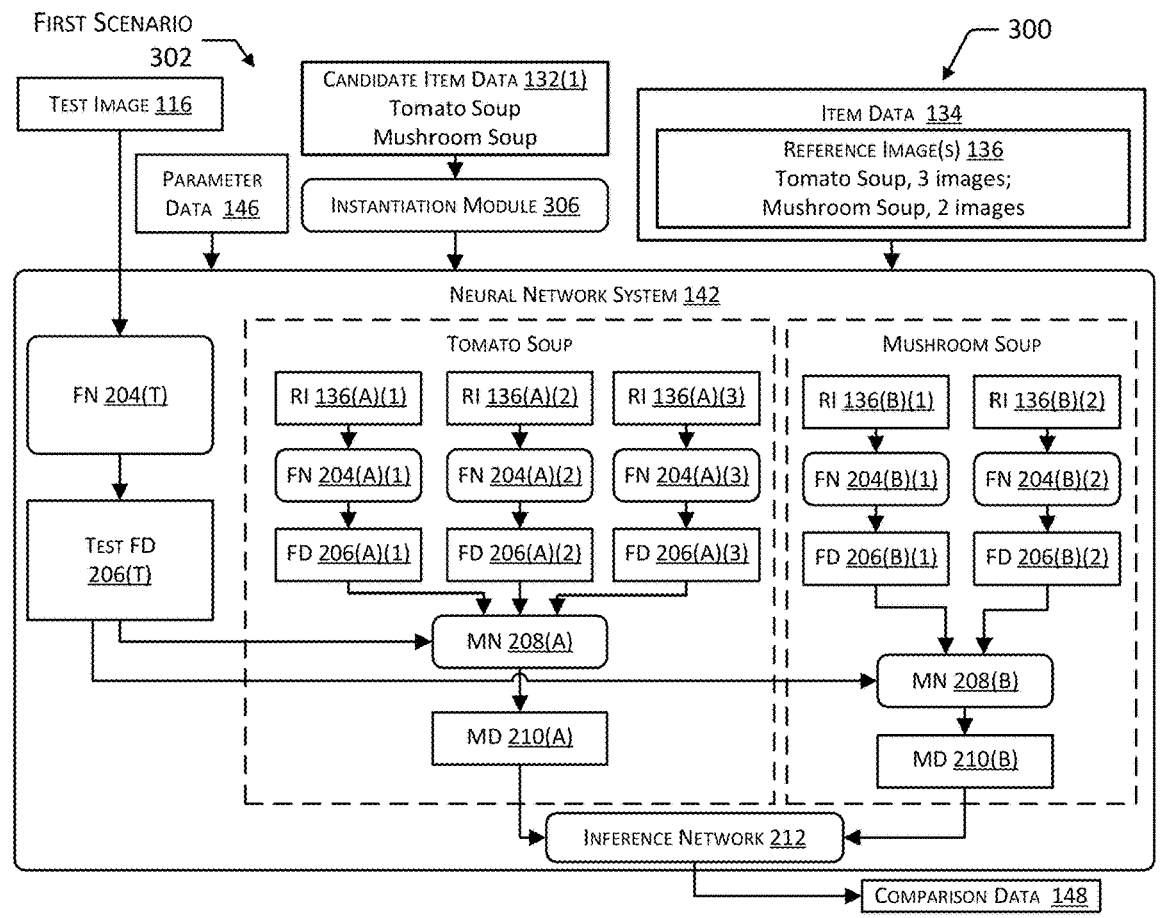
FIG. 3 illustrates a neural network system that is dynamically configured for a first scenario and a second scenario, according to some implementations.
Figure 3:
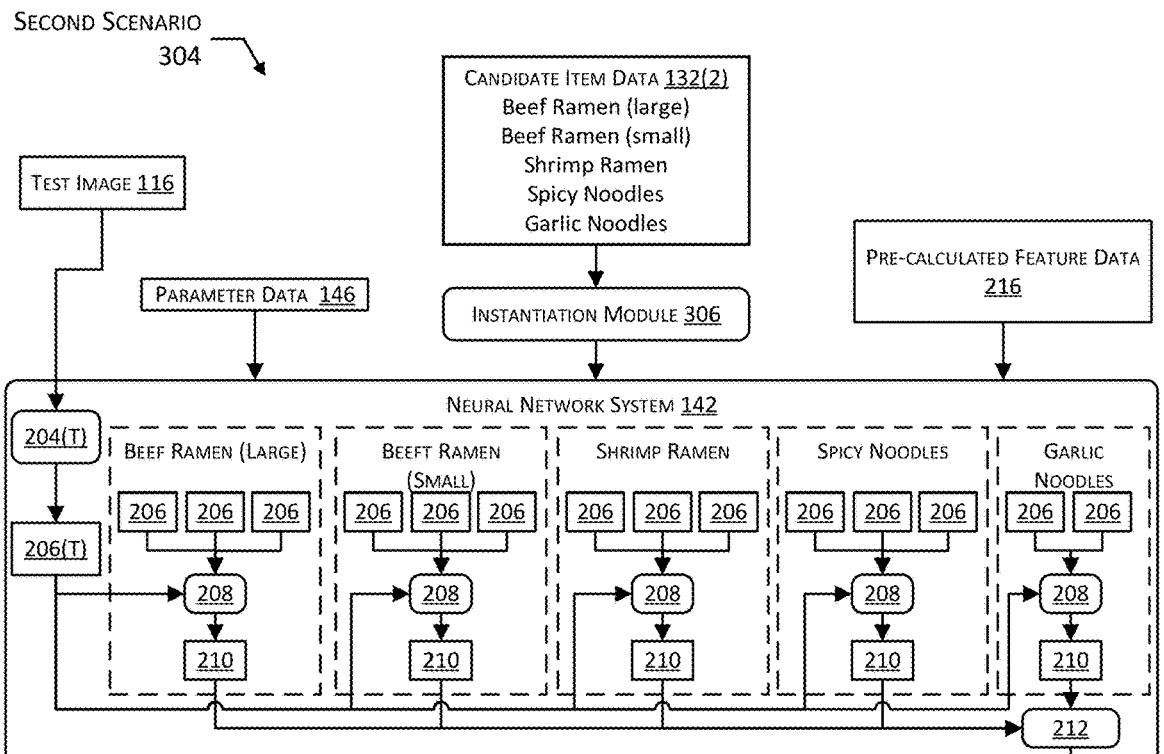

FIG. 3 illustrates 300 a neural network system that is dynamically configured during normal operation for a first scenario 302 and a second scenario 304, according to some implementations. Because the neural network system 142 is not being trained, the training data 144 is omitted, parameter data 146 is fixed, and so forth.

In the first scenario 302, an interaction 122(1) has taken place, and candidate item data 132(1) has been determined that is indicative of two possible types of items that may have been involved in the interaction 122: tomato soup and mushroom soup. The instantiation module 306 determines, based on the candidate item data 132(1), that there are two different types of item for comparison. The instantiation module 306 accesses the item data 134 associated with the types of items in the candidate item data 132(1) and determines the reference images 136 for those types of items. As shown in the first scenario 302, the item data 134 retrieved includes three references images 136(A)(1), 136(A)(2), and 136(A)(3) of the tomato soup type of item and two reference images 136(B)(1) and 136(B)(2) of the mushroom soup type of item. Based on the five references images available in the item data 134, the instantiation module 306 instantiates six feature networks: 204(T) for processing the test image 116 and 204(A)(1), 204(A)(2), 204(A)(3), 204(B)(1), and 204(B)(2). Because the candidate item data 132(1) is indicative of two different types of items, two matching networks 208(A) and 208(B) are instantiated. The instantiated neural network is configured such that the feature data 206 from the reference images 136 of a particular type of item is processed by the same matching network 208. For example, the reference images 136(A)(1), 136(A)(2), and 136(A)(3) are processed by the respective feature networks 204(A)(1), 204(A)(2), 204(A)(3). Each of the respective feature networks 204(A)(1), 204(A)(2), 204(A)(3) in turn provide feature data 206(A)(1), 206(A)(2), 206(A)(3) to the matching network 208(A). The feature network 204(T) processes the test image 116 to produce the test feature data 206(T), which is provided to each of the matching networks 208(A) and 208(B). Each of the matching networks 208(A) and 208(B) provide matching data 210(A) and 210(B), respectively, to the inference network 212. The inference network 212 uses the matching data 210(A) and 210(B) to determine the comparison data 148. For example, if the test image 116 is an image that depicts a type of tomato soup with an item identifier of A94891, the comparison data 148 may indicate that the test image 116 depicts the type of item specified by item identifier A94891.

In the second scenario 304, an interaction 122(2) has taken place, and candidate item data 132(2) has been determined that is indicative of five possible types of items that may have been involved in the interaction 122: beef ramen (large), beef ramen (small), shrimp ramen, spicy noodles, and garlic noodles.

In this scenario, the instantiation module 306 instantiates one feature network 204(T) for processing the test image 116 and five matching networks 208, one for each of the types of items. The feature network 204(T) processes the test image 116 to determine the test feature data 206(T). In this implementation, the feature data 206 for each of the references images 136 are retrieved from the pre-calculated feature data 216 that stores feature data 206 for respective ones of the reference images 136. As described above, in other implementations feature networks 204 may be instantiated for each reference image 136 in the item data 134 and the feature data 206 may be determined during operation of the neural network system 142.

As illustrated here, there may be different numbers of reference images 136 associated with each type of item. For example, the first four types of items each have three reference images 136, while the last type of item (garlic noodles) is only associated with two reference images 136.

The dynamic configuration of the graph of the neural network based on the candidate item data 132 at a particular time is readily seen by comparing the two scenarios. For example, the first scenario 302 is used to deal with an interaction 122(1) in which there are two types of items in the candidate item data 132 and thus instantiates two matching networks 208, while the second scenario is used to deal with an interaction 122(2) in which there are five types of items and instantiates five matching networks 208.

Figure 4:
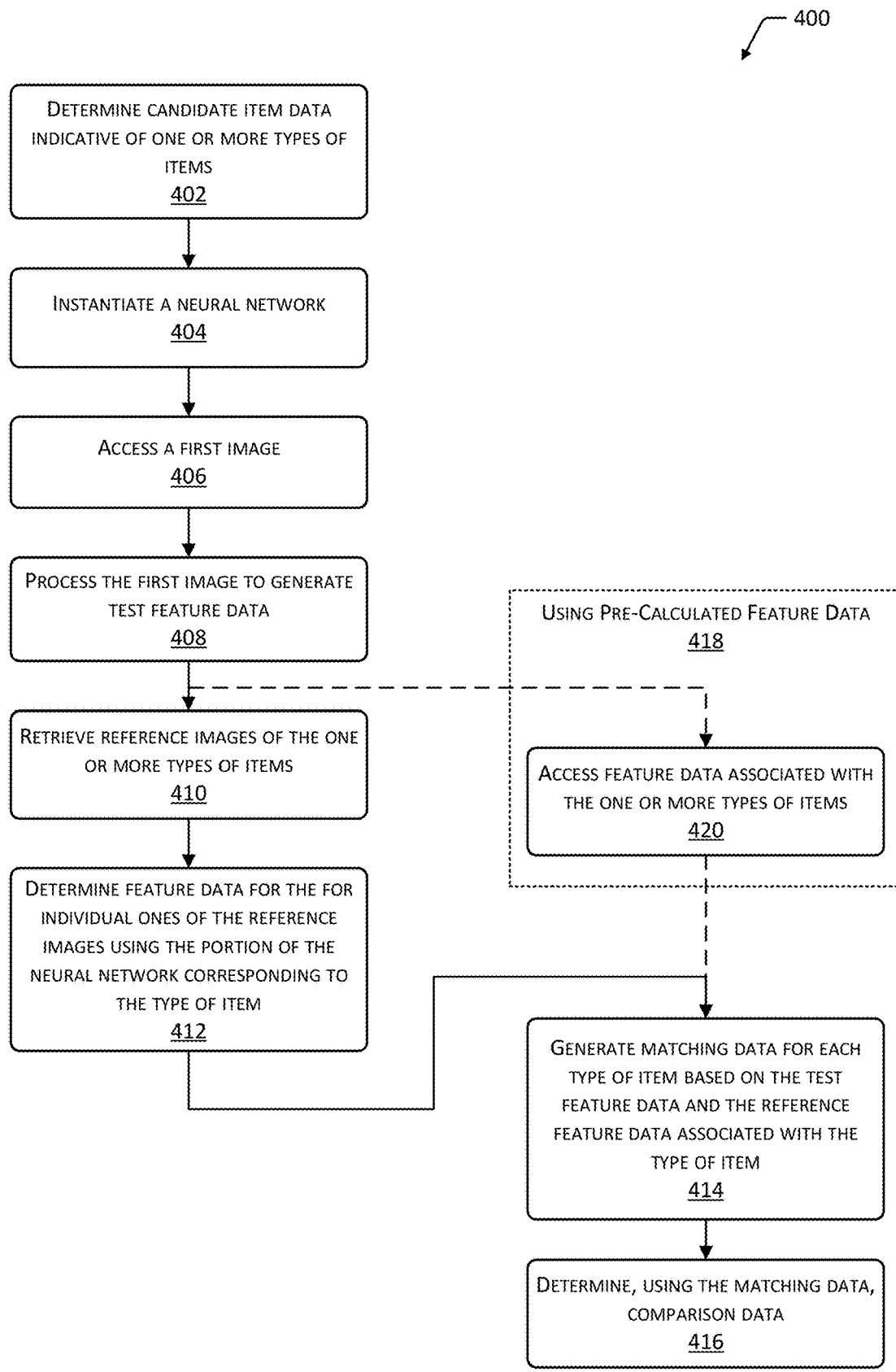
FIG. 4 illustrates a flow diagram of a process to use a dynamically instantiated neural network to determine if there is a match between an item depicted in a test image and an item depicted in one or more reference images, according to some implementations.

FIG. 4 illustrates a flow diagram 400 of a process to use a dynamically instantiated neural network to determine if there is a match between an item 106 depicted in a test image 116 and an item depicted in one or more reference images 136, according to some implementations. The process may be implemented at least in part by the inventory management system 120.

At 402 candidate item data 132 is determined. The candidate item data 132 may be indicative of one or more types of items that are deemed to be possibly involved in the interaction 122. In one implementation, the candidate item data 132 may be determined based on where the user 108 is within the facility and what items 106 are stowed nearby. For example, a location of an inventory location, such as the shelf 102 may be determined. Continuing the example, the tracking system 126 may provide user location data 128 indicative of a location of the user 108 within the facility. A determination may be made that the location of the user 108 is within a threshold distance of the location of the inventory location. Continuing the example, the user 108 is determined to be less than one meter from the shelf 102 that contains packages of Brand X beef ramen, large size. As a result, the candidate item data 132 is generated that includes Brand X beef ramen, large size.

In another implementation, the candidate item data 132 may be determined based on the one or more inventory locations that are within a field of view of the first image. The one or more types of items that are designated as being stowed at the one or more inventory locations within that field of view may be added to the candidate item data 132. For example, the test image 116 may include a shelf 102 with lanes 104(1)-(3). The item location data 138 may be accessed to determine what item identifiers are designated as being stowed at the shelf 102 at lanes 104(1)-(3). These item identifiers may then be added to the candidate item data 132.

The inventory locations that are within the field of view may be determined based on image processing, previously stored data about location of the camera 112(1) and the inventory location, and so forth. For example, given a known location of the inventory locations and the camera 112(1), as well as information about the camera 112(1) such as pose, parameters about the lens system of the camera, and so forth, the field of view may be calculated and used to determine the inventory locations in that volume. In another example, optical tags that are machine readable may be located at the inventory locations. Information encoded in the optical tags may provide information about location, item identifier, and so forth. For example, the optical tags may comprise bar codes that encode item identifiers for each lane 104. The test image 116 may be processed to read an item identifier encoded in an optical tag. This item identifier may then be included in the candidate item data 132.

At 404, at least a portion of a neural network is instantiated. For example, the instantiation module 202 may operate to instantiate the neural network. The neural network may comprise one or more feature networks 204, one or more matching networks 208, and an inference network 212. The parameters of the neural network are specified by parameter data 146 that was generated during training. A feature network 204 may be instantiated for each image that is to be processed by the neural network system 142. For example, a test feature network 204(T) is instantiated to process a test image 116. Each of the feature networks 204, including the test feature network 204, are instantiated with identical parameters as provided by the parameter data 146.

A matching network 208 is instantiated for each type of item that is indicated by the candidate item data 132. Each of the matching networks 208 are instantiated with identical parameters as provided by the parameter data 146. Continuing the example, if three types of items 106 are indicated in the candidate item data 132, then three matching networks 208 are instantiated.

The neural network system 142 may operate using reference images 136 or using previously generated feature data such as feature data 206 that are stored as pre-calculated feature data 216. In the implementation in which reference images 136 are processed, a separate feature network 204 may be instantiated for each reference image 136 that is to be processed. Each type of item in the candidate item data 132 is associated with one or more reference images 136. Each of these feature networks 204 generates respective feature data 206. In another implementation, the feature data 206 may be retrieved from pre-calculated feature data 216 and used by the matching network 208, without instantiating the feature networks 204 for processing reference images 136.

The feature data 206 from each feature network 204 is provided to a particular matching network 208 that is associated with one of the types of item that are in the candidate item data 132. As described above, the feature data 206 may be generated using a feature network 204 instantiated contemporaneously with the instantiation of the matching network 208, or the feature data 206 may be retrieved.

At 406, a first image is accessed. For example, the first image may be the test image 116 that is associated with an interaction 122. The first image is acquired by a camera 112(1). In some implementations, the first image may comprise an image acquired by the camera 112(1) that has been previously processed. For example, the first image may comprise a cropped or extracted portion of a full-frame image. Continuing the example, the full-frame image may be processed using one or more techniques to identify an item 106 that is in or near the user's 108 hand. The resulting cropped image of the item 106 which may include a portion of the user's 108 hand, such as some fingers, wrist, back of hand, etc., may then be used as the first image. In another example, the full-frame image may be processed such that a bounding box or other polygon is used to denote the portion of the full-frame image that involves the item 106. In this example, the first image comprises the full-frame image, but subsequent processing by the neural network system 142 may be constrained to use the portion of the image that is within the bounding box.

This processing may be implemented, at least in part, using one or more of the following tools or techniques. For example, processing of the full-frame image may be performed, at least in part, using one or more tools available in the OpenCV library as developed by Intel Corporation of Santa Clara, California, USA; Willow Garage of Menlo Park, California, USA; and Itseez of Nizhny Novgorod, Russia, with information available at www.opencv.org. In another implementation, functions available in the OKAO machine vision library as promulgated by Omron Corporation of Kyoto, Japan, may be used to process the image data. In still another implementation, functions such as those in the Machine Vision Toolbox for Matlab (MVTB) available using MATLAB as developed by MathWorks, Inc. of Natick, Massachusetts, USA, may be utilized.

At 408 the first image is processed to generate test feature data 206(T). For example, the instantiation module 202 may instantiate the test feature network 204(T) using at least a portion of the parameter data 146. The test feature network 204(T) processes the test image 116 to produce the test feature data 206(T).

Two implementations of the process are available. A first implementation is described with regard to 410 and 412, while a second implementation is described with regard to 420.

In the first implementation, the process proceeds to 410. The reference images 136 that are associated with the one or more types of items indicated by the candidate item data 132 are retrieved. For example, the candidate item data 132 indicates Brand X beef ramen, large size. The reference images 136 of a package of Brand X beef ramen, large size, are retrieved. These reference images 136 may depict an exemplary package of Brand X beef ramen in different poses. In some implementations, five or fewer reference images 136 may be used for each type of item. For example, three reference images 136 may be stored for each type of item.

At 412 reference feature data 206 is determined for each of the reference images 136 using the respective portion of the neural network corresponding to the type of item. For example, the feature network 204(A)(1) that is instantiated to process reference image 136(A)(1) is used to generate the feature data 206(A)(1).

At 414, matching data 210 is generated for each type of item, based on the test feature data 206(T) and the reference feature data 206 associated with the type of item. The matching data 210 may comprise a scalar value. For example, the matching data 210 may comprise a binary value, or may indicate a likelihood of a match with a value of between 0 and 1.

At 416 the inference network 212 uses the matching data 210 and generates the comparison data 148. For example, the comparison data 148 may indicate that the test image 116 is deemed to match one of the types of items indicated by the candidate item data 132.

The inventory management system 120 may make use of this information. The comparison data 148 may then be used to generate other information. For example, the interaction data 152 may be generated that indicates one or more of a pick from, or place to, the shelf of an item indicated by the comparison data 148. The interaction data 152 may then be used to generate the user billing data 156 that is associated with a user account. For example, the interaction data 152 may indicate a pick of a quantity of one of item Brand X beef ramen, size large. The user billing data 156 may be indicative of a charge for the cost of that item 106 indicated by the interaction data 152. A quantity on hand of one or more of the first type of item at an inventory location may be updated based on the interaction data 152. Continuing example, the pick of the quantity of one of item Brand X beef ramen, size large, from the lane 104(1) may result in the quantity on hand at lane 104(1) being reduced by one.

The inventory management system 120 may use the comparison data 148 to determine tidiness data about a particular inventory location. The tidiness data is indicative of whether the inventory location contains a type of item that is designated for storage at that inventory location. For example, if the comparison data 148 indicates that an item 106 being placed at lane 104(1) is Brand X beef ramen, large size, and lane 104(1) is associated with storing Brand X shrimp ramen, tidiness data that indicates lane 104(1) is now untidy may be generated.

Returning to 408, a second implementation as illustrated at 418 uses the pre-calculated feature data 216. In this implementation, instead of instantiating the feature networks 204 and processing reference images 136, the previously calculated feature data 206 that is associated with each type of item is retrieved. The process may proceed from 408 to 420. At 420 feature data associated with the one or more types of items is accessed. For example, the candidate item data 132 may specify one or more item identifiers. These item identifiers may be used to retrieve from pre-calculated feature data 216, those feature data 206 associated with those item identifiers. Once retrieved, the process proceeds to 414, in which the retrieved feature data 206 is used by the matching networks 208.

Figure 5:
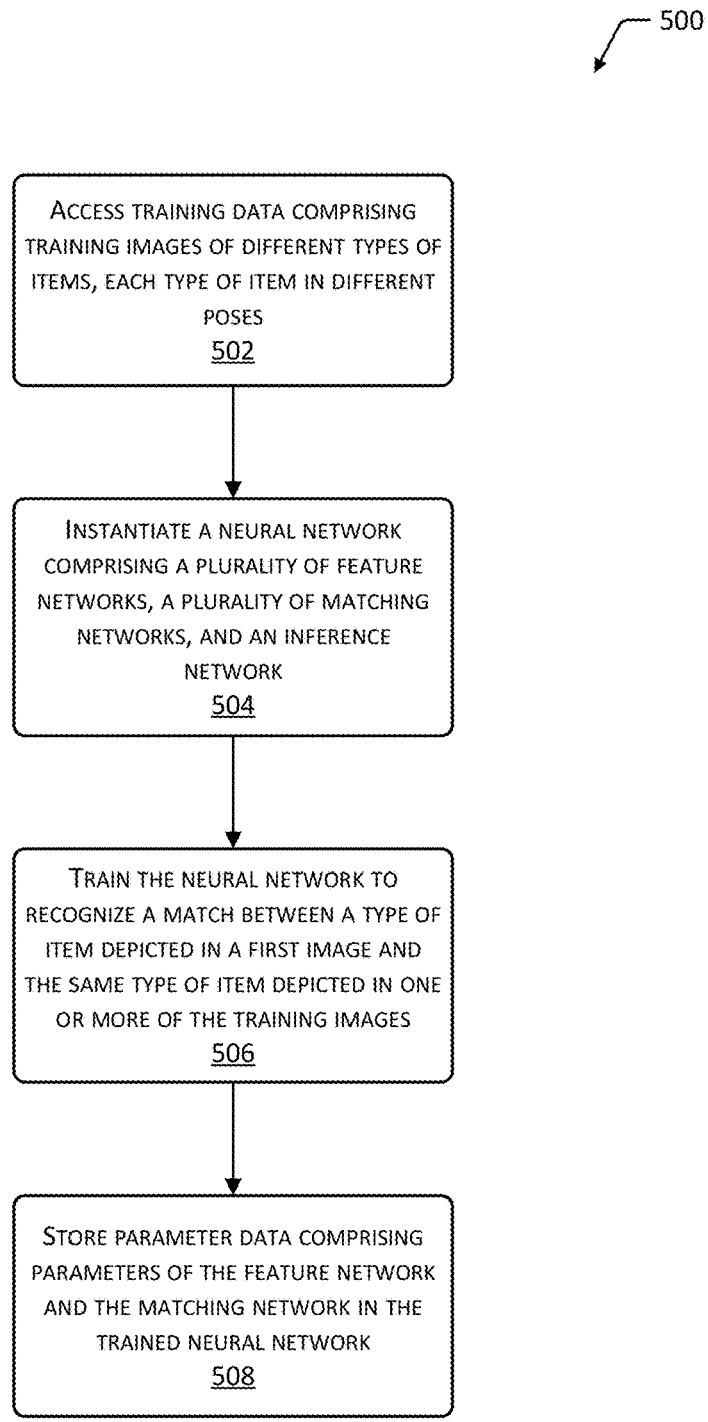
FIG. 5 illustrates a flow diagram of a process to generate parameter data used to operate the dynamically instantiated neural network, according to some implementations.

FIG. 5 illustrates a flow diagram 500 of a process to generate parameter data 146 used to operate the dynamically instantiated neural network, according to some implementations. The process may be implemented at least in part by the inventory management system 120.

At 502 training data 144 is accessed. The training data 144 comprises training images of different types of items. The images are of different items in different poses. For example, the training data 144 may comprise two images each of 3000 different items, for a total of 6000 images. In other implementations more or fewer images may be used. The training data 144 may utilize one or more of the reference images 136.

At 504 a neural network is instantiated. For example, the instantiation module 202 may instantiate the neural network comprising a plurality of feature networks 204, a plurality of matching networks 208, and an inference network 212. The size of the neural network as instantiated for training may be based on available compute resources. For example, it may be computationally feasible to train the neural network system 142 using 60 different reference images 136 at one time. Continuing the example, this may result in the neural network being instantiated that includes 61 feature networks 204, including one for the test image 116, and 30 matching networks 208.

At 506 the neural network is trained to recognize a match between a type of item depicted in the first image and the same type of item depicted in one or more of the images in the training data 144. The neural network, including the feature networks 204, matching networks 208, and inference network 212, is trained end-to-end using labeled data. For example, the labeled data may comprise images with associated metadata indicating that they depict the same item 106.

The feature network 204 may comprise a CNN. In some implementations the CNN may utilize a resnet architecture. During training, the feature network 204 operates in a "Siamese" or lateral sharing architecture in which functions $G_w$ that comprise the nodes of the neural network sharing the same set of parameters W. For example, the gradients produced during operation for all of the reference images 136 may be averaged together and then subsequently used. By using this lateral sharing architecture, memory requirements are significantly reduced during training. For example, by averaging the gradients the memory requirements are reduced such that a single GPU is able to perform the calculation during the training mode, allowing for more efficient operation of the feature network 204 in the training mode.

The matching network 208 may comprise an MLP architecture that also utilizes the "Siamese" or lateral sharing architecture. This reduces the memory and processor requirements associated with operating the matching network 208 in the training mode.

During training, at the beginning and the end of each epoch, the parameters between similar portions of the network are the same. For example, at the beginning of an epoch, the parameters of all the feature networks 204 are the same. At the end of the epoch, the parameters of all the feature networks 204 are again the same, however, they may differ in value from the beginning of the epoch. In another example, at the beginning of an epoch, the parameters of all the matching networks 208 are the same. Likewise, at the end of the epoch, the parameters of the matching networks 208 are again the same, albeit possibly different from those values at the beginning.

In one implementation, the training data 144 may be submitted for processing as simultaneous inputs. For example, the neural network may be instantiated with 6001 feature networks 204 to accommodate 6000 different reference images 136. In another implementation, the training data 144 may be submitted for processing in batches. For example, the training data 144 may be divided into batches with different combinations of reference images 136 during different runs.

In some implementations the training data 144 may be augmented using various synthetic transformation techniques. For example, an original image of an item 106 may be modified to change one or more colors, apply a perspective distortion, change contrast, rescale the item, rotate the image, and so forth to provide a synthetically transformed image of the item. This synthetically transformed image may then be used as part of the training data 144.

The neural network may be trained until a sufficient level of accuracy is achieved and prior to the neural network entering an overfitted state. Once trained the neural network is able to determine if a test image 116 depicts a type of item that is the same as a type of item depicted in one of the reference images 136. For example, the neural network is able to determine if the can of soup in the test image 116 obtained with a first pose is the same can of soup depicted in a reference image 136 that has a second pose different from the first. The neural network is not trained to determine if the test image 116 is identical to the reference images 136.

At 508 the parameter data 146 is stored. For example, the parameter data 146 may comprise feature network parameters that describe the parameters of the feature network 204 and matching network parameters that describe the matching network 208 after training has concluded. During subsequent normal operation, the instantiation module 202 may utilize the parameter data 146 to instantiate the feature networks 204 and the matching networks 208.

Figure 6:
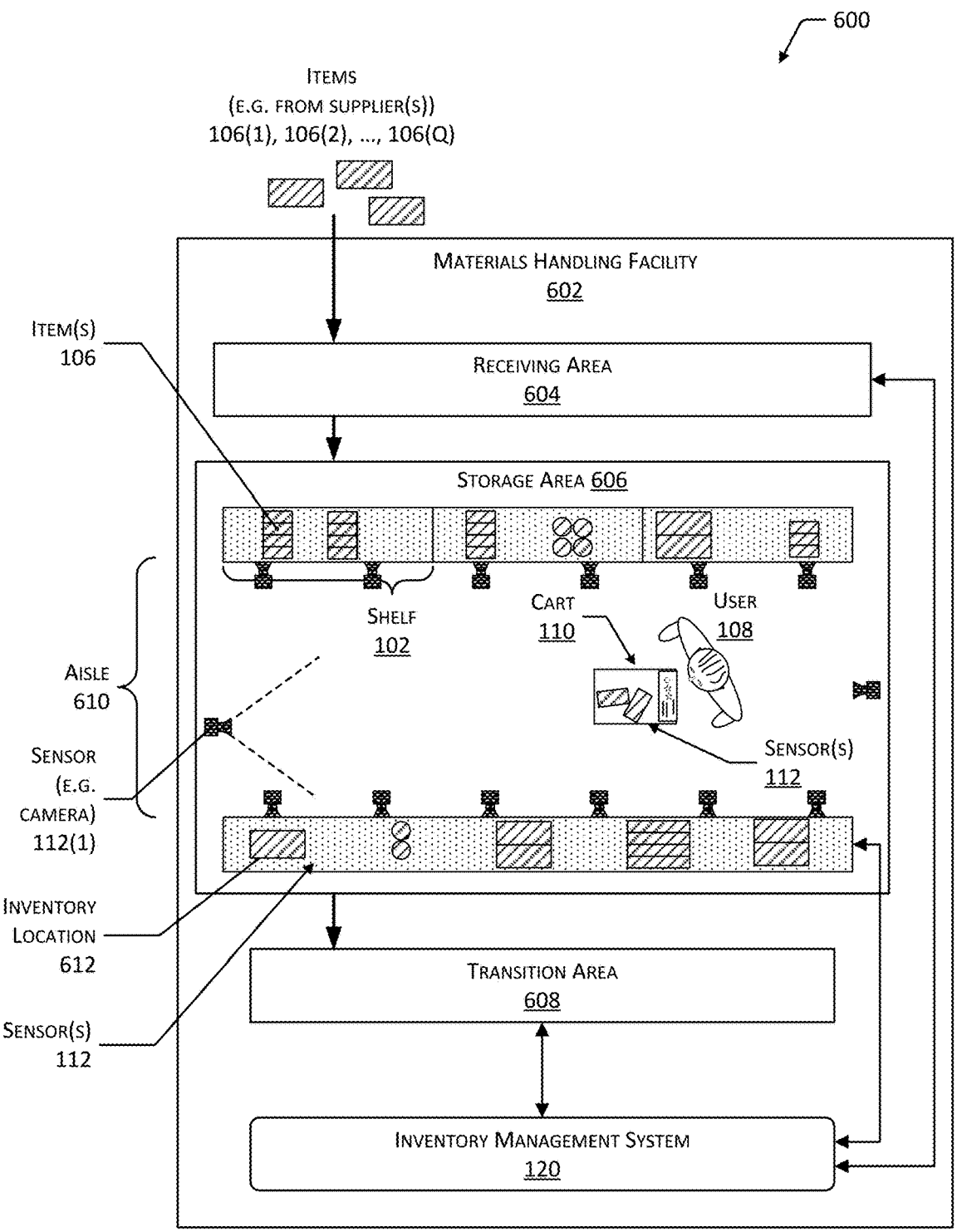
FIG. 6 is a block diagram illustrating a materials handling facility (facility) using the system, according to some implementations.

FIG. 6 is a block diagram 600 illustrating a materials handling facility (facility) 602 using the system 100, according to some implementations. A facility 602 comprises one or more physical structures or areas within which one or more items 106(1), 106(2), . . . , 106(Q) may be held. As used in this disclosure, letters in parenthesis such as "(Q)" indicate an integer value greater than or equal to zero. The items 106 may comprise physical goods, such as books, pharmaceuticals, repair parts, electronic gear, and so forth.

The facility 602 may include one or more areas designated for different functions with regard to inventory handling. In this illustration, the facility 602 includes a receiving area 604, a storage area 606, and a transition area 608.

The receiving area 604 may be configured to accept items 106, such as from suppliers, for intake into the facility 602. For example, the receiving area 604 may include a loading dock at which trucks or other freight conveyances unload the items 106. In some implementations, the items 106 may be processed, at the receiving area 604, to generate at least a portion of the item data 134. For example, an item 106 may be weighed, imaged, or otherwise scanned to develop reference images 136 or representations of the item 106 at the receiving area 604.

The storage area 606 is configured to store the items 106. The storage area 606 may be arranged in various physical configurations. In one implementation, the storage area 606 may include one or more aisles 610. The aisle 610 may be configured with, or defined by, inventory locations 612 on one or both sides of the aisle 610. The inventory locations 612 may include one or more of a shelf 102, a rack, a case, a cabinet, a bin, a floor location, or other suitable storage mechanisms for holding, supporting, or storing the items 106. For example, the inventory locations 612 may comprise shelves 102 with lanes 104 designated therein. The inventory locations 612 may be affixed to the floor or another portion of the structure of the facility 602. The inventory locations 612 may also be movable such that the arrangements of aisles 610 may be reconfigurable. In some implementations, the inventory locations 612 may be configured to move independently of an outside operator. For example, the inventory locations 612 may comprise a rack with a power source and a motor, operable by a computing device to allow the rack to move from one location within the facility 602 to another.

One or more users 108 and carts 110 or other material handling apparatus may move within the facility 602. For example, the user 108 may move about within the facility 602 to pick or place the items 106 in various inventory locations 612, placing them in the cart 110 for ease of transport. The cart 110 is configured to carry or otherwise transport one or more items 106. For example, the cart 110 may include a basket, cart, bag, bin, and so forth. In other implementations, other material handling apparatuses such as robots, forklifts, cranes, aerial drones, and so forth, may move about the facility 602 picking, placing, or otherwise moving the items 106. For example, a robot may pick an item 106 from a first inventory location 612(1) and move the item 106 to a second inventory location 612(2).

While the storage area 606 is depicted as having one or more aisles 610, inventory locations 612 storing the items 106, sensors 112, and so forth, it is understood that the receiving area 604, the transition area 608, or other areas of the facility 602 may be similarly equipped. Furthermore, the arrangement of the various areas within the facility 602 is depicted functionally rather than schematically. For example, in some implementations, multiple different receiving areas 604, storage areas 606, and transition areas 608 may be interspersed rather than segregated in the facility 602.

The facility 602 may include, or be coupled to, the inventory management system 120 described above. The inventory management system 120 is configured to interact with users 108 or devices such as sensors 112, robots, material handling equipment, computing devices, and so forth, in one or more of the receiving area 604, the storage area 606, or the transition area 608.

During operation of the facility 602, the weight sensors 112(2) and other sensors 112 may be configured to provide sensor data 114, or information based on the sensor data 114, to the inventory management system 120. The sensor data 114 may include image data, non-image data, weight sensor data obtained from weight sensors 112, and so forth. The sensors 112 may include, but are not limited to, cameras 112(1), weight sensors 112(2), and so forth. The sensors 112 may be stationary or mobile, relative to the facility 602. For example, the facility 602 may include cameras 112(1) to obtain images of the user 108 or other objects in the facility 602. In another example, the inventory locations 612 may contain weight sensors 112(2) to acquire weight sensor data of items 106 stowed therein, cameras 112(1) to acquire images of picking or placement of items 106 on shelves 102, and so forth. The sensors 112 are described in more detail below with regard to FIG. 7.

The inventory management system 120 or other systems may use the sensor data 114 to track the location of objects within the facility 602, movement of the objects, or provide other functionality. Objects may include, but are not limited to, items 106, users 108, carts 110, and so forth. For example, a series of images acquired by the cameras 112(1) may indicate removal by the user 108 of an item 106 from a particular location on the inventory location 612 and placement of the item 106 on or at least partially within the cart 110.

The facility 602 may be configured to receive different kinds of items 106 from various suppliers and to store them until a customer orders or retrieves one or more of the items 106. A general flow of items 106 through the facility 602 is indicated by the arrows of FIG. 6. Specifically, as illustrated in this example, items 106 may be received from one or more suppliers, such as manufacturers, distributors, wholesalers, and so forth, at the receiving area 604. In various implementations, the items 106 may include merchandise, commodities, perishables, or any suitable type of item 106, depending on the nature of the enterprise that operates the facility 602.

Upon being received from a supplier at the receiving area 604, the items 106 may be prepared for storage in the storage area 606. For example, in some implementations, items 106 may be unpacked or otherwise rearranged. The inventory management system 120 may include one or more software applications executing on a computer system to provide inventory management functions. These inventory management functions may include maintaining information indicative of the type, quantity, condition, cost, location, weight, or any other suitable parameters with respect to the items 106. The items 106 may be stocked, managed, or dispensed in terms of countable units, individual units, or multiple units, such as packages, cartons, crates, pallets, or other suitable aggregations. Alternatively, some items 106, such as bulk products, commodities, and so forth, may be stored in continuous or arbitrarily divisible amounts that may not be inherently organized into countable units. Such items 106 may be managed in terms of a measurable quantity such as units of length, area, volume, weight, time, duration, or other dimensional properties characterized by units of measurement. Generally speaking, a quantity of an item 106 may refer to either a countable number of individual or aggregate units of an item 106 or a measurable amount of an item 106, as appropriate.

After arriving through the receiving area 604, items 106 may be stored within the storage area 606. In some implementations, like items 106 may be stored or displayed together in the inventory locations 612 such as in bins, on shelves 102, hanging from pegboards, and so forth. In this implementation, all items 106 of a given kind are stored in one inventory location 612. In other implementations, like items 106 may be stored in different inventory locations 612. For example, to optimize retrieval of certain items 106 having frequent turnover within a large physical facility 602, those items 106 may be stored in several different inventory locations 612 to reduce congestion that might occur at a single inventory location 612.

When a customer order specifying one or more items 106 is received, or as a user 108 progresses through the facility 602, the corresponding items 106 may be selected or "picked" from the inventory locations 612 containing those items 106. In various implementations, item picking may range from manual to completely automated picking. For example, in one implementation, a user 108 may have a list of items 106 they desire and may progress through the facility 602 picking items 106 from inventory locations 612 within the storage area 606 and placing those items 106 into a cart 110. In other implementations, employees of the facility 602 may pick items 106 using written or electronic pick lists derived from customer orders. These picked items 106 may be placed into the cart 110 as the employee progresses through the facility 602.

After items 106 have been picked, the items 106 may be processed at a transition area 608. The transition area 608 may be any designated area within the facility 602 where items 106 are transitioned from one location to another or from one entity to another. For example, the transition area 608 may be a packing station within the facility 602. When the item 106 arrives at the transition area 608, the item 106 may be transitioned from the storage area 606 to the packing station. Information about the transition may be maintained by the inventory management system 120.

In another example, if the items 106 are departing the facility 602, a list of the items 106 may be obtained and used by the inventory management system 120 to transition responsibility for, or custody of, the items 106 from the facility 602 to another entity. For example, a carrier may accept the items 106 for transport with that carrier accepting responsibility for the items 106 indicated in the list. In another example, a user 108 may purchase or rent the items 106 and remove the items 106 from the facility 602. During use of the facility 602, the user 108 may move about the facility 602 to perform various tasks, such as picking or placing the items 106 in the inventory locations 612.

To facilitate operation of the facility 602, the inventory management system 120 is configured to use the sensor data 114, such as image data, weight sensor data, and other information such as the item data 134, physical layout data, and so forth, to generate interaction data 152. For example, the neural network system 142 may be used to determine which type of item 106 is involved in an interaction 122.

The interaction data 152 may provide information about an interaction 122, such as a pick of an item 106 from the inventory location 612, a place of an item 106 to the inventory location 612, a touch made to an item 106 at the inventory location 612, a gesture associated with an item 106 at the inventory location 612, and so forth. The interaction data 152 may include one or more of the type of interaction 122, interaction location identifier indicative of where from the inventory location 612 the interaction took place, item identifier, quantity change to the item 106, user identifier, and so forth. The interaction data 152 may then be used to further update the item data 134. For example, the quantity of items 106 on hand at a particular lane 104 on the shelf 102 may be changed based on an interaction 122 that picks or places one or more items 106.

As described above, the inventory management system 120 may perform other operations, such as determining inventory data 140, determining user billing data 156, and so forth.

Figure 7:
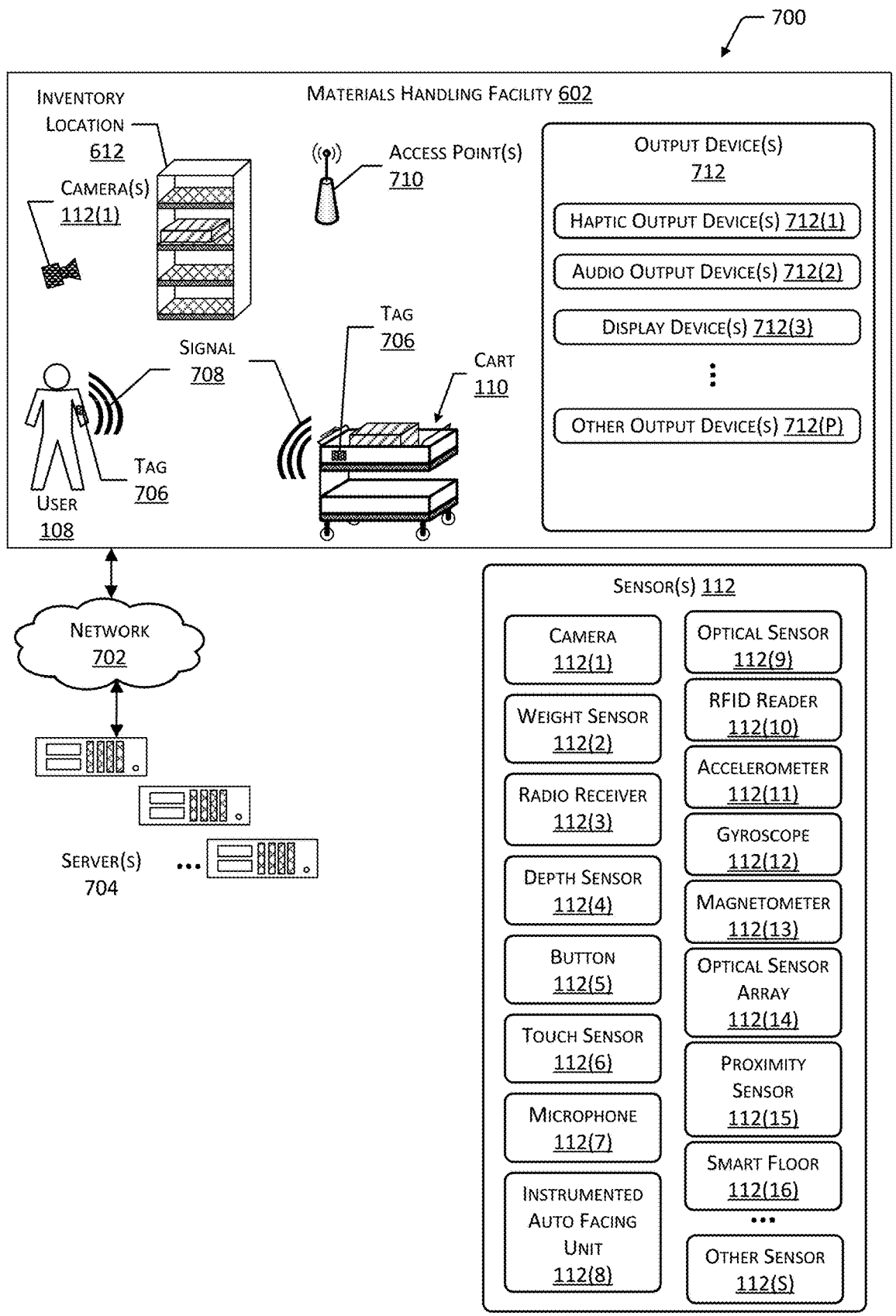
FIG. 7 is a block diagram illustrating additional details of the facility, according to some implementations.

FIG. 7 is a block diagram 700 illustrating additional details of the facility 602, according to some implementations. The facility 602 may be connected to one or more networks 702, which in turn connect to one or more computing devices, such as servers 704. The network 702 may include private networks such as an institutional or personal intranet, public networks such as the Internet, or a combination thereof. The network 702 may utilize wired technologies (e.g., wires, fiber optic cables, and so forth), wireless technologies (e.g., radio frequency, infrared, acoustic, optical, and so forth), or other connection technologies. The network 702 is representative of any type of communication network, including one or more of data networks or voice networks. The network 702 may be implemented using wired infrastructure (e.g., copper cable, fiber optic cable, and so forth), a wireless infrastructure (e.g., cellular, microwave, satellite, and so forth), or other connection technologies.

The servers 704 may be configured to execute one or more modules or software applications associated with the inventory management system 120 or other systems. While the servers 704 are illustrated as being in a location outside of the facility 602, in other implementations, at least a portion of the servers 704 may be located at the facility 602. The servers 704 are discussed in more detail below with regard to FIG. 8.

The users 108, the carts 110, items 106, or other objects in the facility 602 may be equipped with one or more tags 706. The tags 706 may be configured to emit a signal 708. In one implementation, the tag 706 may be a radio frequency identification (RFID) tag 706 configured to emit an RF signal 708 upon activation by an external signal. For example, the external signal may comprise a radio frequency signal or a magnetic field configured to energize or activate the RFID tag 706. In another implementation, the tag 706 may comprise a transmitter and a power source configured to power the transmitter. For example, the tag 706 may comprise a Bluetooth Low Energy (BLE) transmitter and battery. In other implementations, the tag 706 may use other techniques to indicate presence of the tag 706. For example, an acoustic tag 706 may be configured to generate an ultrasonic signal 708, which is detected by corresponding acoustic receivers. In yet another implementation, the tag 706 may be configured to emit an optical signal 708.

The inventory management system 120 may be configured to use the tags 706 for one or more of identification of the object, determining a location of the object, and so forth. For example, the users 108 may wear tags 706, the carts 110 may have tags 706 affixed, items 106 may have tags 706 affixed to their packaging, and so forth, which may be read and, based at least in part on signal strength, used to determine one or more of identity or location.

Generally, the inventory management system 120 or other systems associated with the facility 602 may include any number and combination of input components, output components, and servers 704.

The one or more sensors 112 may be arranged at one or more locations within the facility 602. For example, the sensors 112 may be mounted on or within a floor, wall, at a ceiling, at an inventory location 612, on a cart 110, may be carried or worn by a user 108, and so forth.

The sensors 112 may include one or more cameras 112(1) or other imaging sensors. The one or more cameras 112(1) may include imaging sensors configured to acquire images of a scene. The cameras 112(1) are configured to detect light in one or more wavelengths including, but not limited to, terahertz, infrared, visible, ultraviolet, and so forth. The cameras 112(1) may comprise charge coupled devices (CCD), complementary metal oxide semiconductor (CMOS) devices, microbolometers, and so forth. The inventory management system 120 may use image data acquired by the cameras 112(1) during operation of the facility 602. For example, the inventory management system 120 may identify items 106, users 108, carts 110, and so forth, based at least in part on their appearance within the image data acquired by the cameras 112(1). The cameras 112(1) may be mounted in various locations within the facility 602. For example, cameras 112(1) may be mounted overhead, on inventory locations 612, may be worn or carried by users 108, may be affixed to carts 110, and so forth.

The one or more weight sensors 112(2) are configured to measure the weight of a load, such as the item 106, the cart 110, or other objects. The weight sensors 112(2) may be configured to measure the weight of the load at one or more of the inventory locations 612, the cart 110, on the floor of the facility 602, and so forth. For example, the shelf 102 may include a plurality of lanes 104 or platforms, with one or more weight sensors 112(2) beneath each one to provide weight data 118 about an individual lane 104 or platform. The weight sensors 112(2) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 112(2) may operate as transducers that generate one or more signals based on an applied force, such as that of the load due to gravity. For example, the weight sensor 112(2) may comprise a load cell having a strain gauge and a structural member that deforms slightly when weight is applied. By measuring a change in the electrical characteristic of the strain gauge, such as capacitance or resistance, the weight may be determined. In another example, the weight sensor 112(2) may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 120 may use the data acquired by the weight sensors 112(2) to identify an object, determine a change in the quantity of objects, determine a location of an object, maintain shipping records, and so forth.

One or more radio receivers 112(3) may also be included as sensors 112. In some implementations, the radio receivers 112(3) may be part of transceiver assemblies. The radio receivers 112(3) may be configured to acquire RF signals 708 associated with RFID, Wi-Fi, Bluetooth, ZigBee, 2G, 3G, 4G, LTE, or other wireless data transmission technologies. The radio receivers 112(3) may provide information associated with data transmitted via radio frequencies, signal strength of RF signals 708, and so forth. For example, information from the radio receivers 112(3) may be used by the inventory management system 120 to determine a location of an RF source, such as a transmitter carried by the user 108, a transmitter on the cart 110, a tag 706 on the item 106, and so forth.

One or more depth sensors 112(4) may also be included in the sensors 112. The depth sensors 112(4) are configured to acquire spatial or three-dimensional (3D) data, such as depth information, about objects within a FOV. The depth sensors 112(4) may include range cameras, lidar systems, sonar systems, radar systems, structured light systems, stereo vision systems, optical interferometry systems, and so forth. The inventory management system 120 may use the 3D data acquired by the depth sensors 112(4) to identify objects, determine a location of an object in 3D real space, identify users 108, and so forth.

One or more buttons 112(5) may be configured to accept input from the user 108. The buttons 112(5) may comprise mechanical, capacitive, optical, or other mechanisms. For example, the buttons 112(5) may comprise mechanical switches configured to accept an applied force from a touch of the user 108 to generate an input signal. The inventory management system 120 may use data from the buttons 112(5) to receive information from the user 108. For example, the cart 110 may be configured with a button 112(5) to accept input from the user 108 and send information indicative of the input to the inventory management system 120.

The sensors 112 may include one or more touch sensors 112(6). The touch sensors 112(6) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 120 may use data from the touch sensors 112(6) to receive information from the user 108. For example, the touch sensor 112(6) may be integrated with the cart 110 to provide a touchscreen with which the user 108 may select from a menu one or more particular items 106 for picking, enter a manual count of items 106 at an inventory location 612, and so forth.

One or more microphones 112(7) may be configured to acquire information indicative of sound present in the environment. In some implementations, arrays of microphones 112(7) may be used. These arrays may implement beamforming techniques to provide for directionality of gain. The inventory management system 120 may use the one or more microphones 112(7) to acquire information from acoustic tags 706, accept voice input from the users 108, determine ambient noise level, and so forth.

The sensors 112 may include instrumented auto facing units (IAFUs) 112(8). The IAFU 112(8) may comprise a position sensor configured to provide data indicative of displacement of a pusher. As an item 106 is removed from the IAFU 112(8), the pusher moves, such as under the influence of a spring, and pushes the remaining items 106 in the IAFU 112(8) to the front of the inventory location 612. By using data from the position sensor, and given item data 134 such as a depth of an individual item 106, a count may be determined, based on a change in position data. For example, if each item 106 is 1 inch deep, and the position data indicates a change of 7 inches, the quantity held by the IAFU 112(8) may have changed by 7 items 106. This count information may be used to confirm or provide a cross check for a count obtained by other means, such as analysis of the weight data 118.

The sensors 112 may include one or more optical sensors 112(9). The optical sensors 112(9) may be configured to provide data indicative of one or more of color or intensity of light impinging thereupon. For example, the optical sensor 112(9) may comprise a photodiode and associated circuitry configured to generate a signal 708 or data indicative of an incident flux of photons. As described below, an optical sensor array 112(14) may comprise a plurality of the optical sensors 112(9). The optical sensors 112(9) may include photodiodes, photoresistors, photovoltaic cells, quantum dot photoconductors, bolometers, pyroelectric infrared detectors, and so forth. For example, the optical sensor 112(9) may use germanium photodiodes to detect infrared light.

One or more radio frequency identification (RFID) readers 112(10), near field communication (NFC) systems, and so forth, may be included as sensors 112. For example, the RFID readers 112(10) may be configured to read the RF tags 706. Information acquired by the RFID reader 112(10) may be used by the inventory management system 120 to identify an object associated with the RF tag 706 such as the item 106, the user 108, the cart 110, and so forth. For example, based on information from the RFID readers 112(10) detecting the RF tag 706 at a particular inventory location, an item 106 being placed or picked may be determined.

The sensors 112 may include one or more accelerometers 112(11), which may be worn or carried by the user 108, mounted to the cart 110, and so forth. The accelerometers 112(11) may provide information such as the direction and magnitude of an imposed acceleration. Data such as rate of acceleration, determination of changes in direction, speed, and so forth, may be determined using the accelerometers 112(11).

A gyroscope 112(12) may provide information indicative of rotation of an object affixed thereto. For example, the cart 110 or other objects may be equipped with a gyroscope 112(12) to provide data indicative of a change in orientation of the object.

A magnetometer 112(13) may be used to determine an orientation by measuring ambient magnetic fields, such as the terrestrial magnetic field. The magnetometer 112(13) may be worn or carried by the user 108, mounted to the cart 110, and so forth. For example, the magnetometer 112(13) mounted to the cart 110 may act as a compass and provide information indicative of which direction the cart 110 is oriented.

An optical sensor array 112(14) may comprise one or optical sensors 112(9). The optical sensors 112(9) may be arranged in a regular, repeating, or periodic two-dimensional arrangement such as a grid. The optical sensor array 112(14) may generate image data. For example, the optical sensor array 112(14) may be arranged within or below an inventory location 612 and obtain information about shadows of items 106, hand of the user 108, and so forth.

The sensors 112 may include proximity sensors 112(15) used to determine presence of an object, such as the user 108, the cart 110, and so forth. The proximity sensors 112(15) may use optical, electrical, ultrasonic, electromagnetic, or other techniques to determine a presence of an object. In some implementations, the proximity sensors 112(15) may use an optical emitter and an optical detector to determine proximity. For example, an optical emitter may emit light, a portion of which may then be reflected by the object back to the optical detector to provide an indication that the object is proximate to the proximity sensor 112(15). In other implementations, the proximity sensors 112(15) may comprise a capacitive proximity sensor 112(15) configured to provide an electrical field and determine a change in electrical capacitance due to presence or absence of an object within the electrical field.

The proximity sensors 112(15) may be configured to provide sensor data 114 indicative of one or more of a presence or absence of an object, a distance to the object, or characteristics of the object. An optical proximity sensor 112(15) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 112 such as a camera 112(1). Based on an apparent distance between the features of the structured light pattern, the distance to the object may be calculated. Other techniques may also be used to determine distance to the object. In another example, the color of the reflected light may be used to characterize the object, such as skin, clothing, cart 110, and so forth.

The sensors 112 may include a smart floor 112(16). The smart floor 112(16) is able to provide information about the location of objects, such as users 108, carts 110, and so forth. This information may include identifying the object, determining a location of the object, tracking the object, and so forth. The smart floor 112(16) may utilize smart floor devices that comprise one or more of transmitters or receivers that radiate or receive electromagnetic signals from antennas located at or underneath the floor. Based on information about what antenna radiated a signal and what antenna acquired the signal, information about an object on or above the floor may be determined. For example, the smart floor 112(16) may comprise sensing elements, or segments. Each segment may include an antenna that is coupled to one or more of a transmitter or a receiver. During operation, the segment may transmit an electromagnetic signal 708 that is radiated by the antenna, receive an electromagnetic signal that is acquired by the antenna, or both. In some implementations the smart floor 112(16) may operate as a physically large touch sensor that is deployed at floor level. The electromagnetic signals provide information about the presence of an object thereon. For example, the segments may electromagnetically couple to objects that are close by, allowing for the detection of objects that are either in contact with the floor or above the floor. In some implementations, instead of or in addition to the visual tracking of the object, the smart floor 112(16) may be used to provide object representation movement data. For example, the output from the segments obtained during a particular window of time may be processed in a fashion similar to the image data.

The sensors 112 may include other sensors 112(S) as well. For example, the other sensors 112(S) may include light curtains, ultrasonic rangefinders, thermometers, barometric sensors, hygrometers, and so forth.

In some implementations, the sensors 112 may include hardware processors, memory, and other elements configured to perform various functions. For example, the cameras 112(1) may be configured to generate image data, send the image data to another device such as the server 704, and so forth.

The facility 602 may include one or more access points 710 configured to establish one or more wireless networks. The access points 710 may use Wi-Fi, NFC, Bluetooth, or other technologies to establish wireless communications between a device and the network 702. The wireless networks allow the devices to communicate with one or more of the sensors 112, the inventory management system 120, the tags 706, a communication device of the cart 110, or other devices.

Output devices 712 may also be provided in the facility 602. The output devices 712 are configured to generate signals 708, which may be perceived by the user 108 or detected by the sensors 112. In some implementations, the output devices 712 may be used to provide illumination of the optical sensor array 112(14).

Haptic output devices 712(1) are configured to provide a signal 708 that results in a tactile sensation to the user 108. The haptic output devices 712(1) may use one or more mechanisms such as electrical stimulation or mechanical displacement to provide the signal 708. For example, the haptic output devices 712(1) may be configured to generate a modulated electrical signal, which produces an apparent tactile sensation in one or more fingers of the user 108. In another example, the haptic output devices 712(1) may comprise piezoelectric or rotary motor devices configured to provide a vibration, which may be felt by the user 108.

One or more audio output devices 712(2) may be configured to provide acoustic output. The acoustic output includes one or more of infrasonic sound, audible sound, or ultrasonic sound. The audio output devices 712(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 712(3) may be configured to provide output, which may be seen by the user 108 or detected by a light-sensitive sensor such as a camera 112(1) or an optical sensor 112(9). In some implementations, the display devices 712(3) may be configured to produce output in one or more of infrared, visible, or ultraviolet light. The output may be monochrome or in color. The display devices 712(3) may be one or more of emissive, reflective, microelectromechanical, and so forth. An emissive display device 712(3), such as using LEDs, is configured to emit light during operation. In comparison, a reflective display device 712(3), such as using an electrophoretic element, relies on ambient light to present an image. Backlights or front lights may be used to illuminate non-emissive display devices 712(3) to provide visibility of the output in conditions where the ambient light levels are low.

The display devices 712(3) may be located at various points within the facility 602. For example, the addressable displays may be located on inventory locations 612, carts 110, on the floor of the facility 602, and so forth.

Other output devices 712(P) may also be present. For example, the other output devices 712(P) may include scent/odor dispensers, document printers, 3D printers or fabrication equipment, and so forth.

Figure 8:
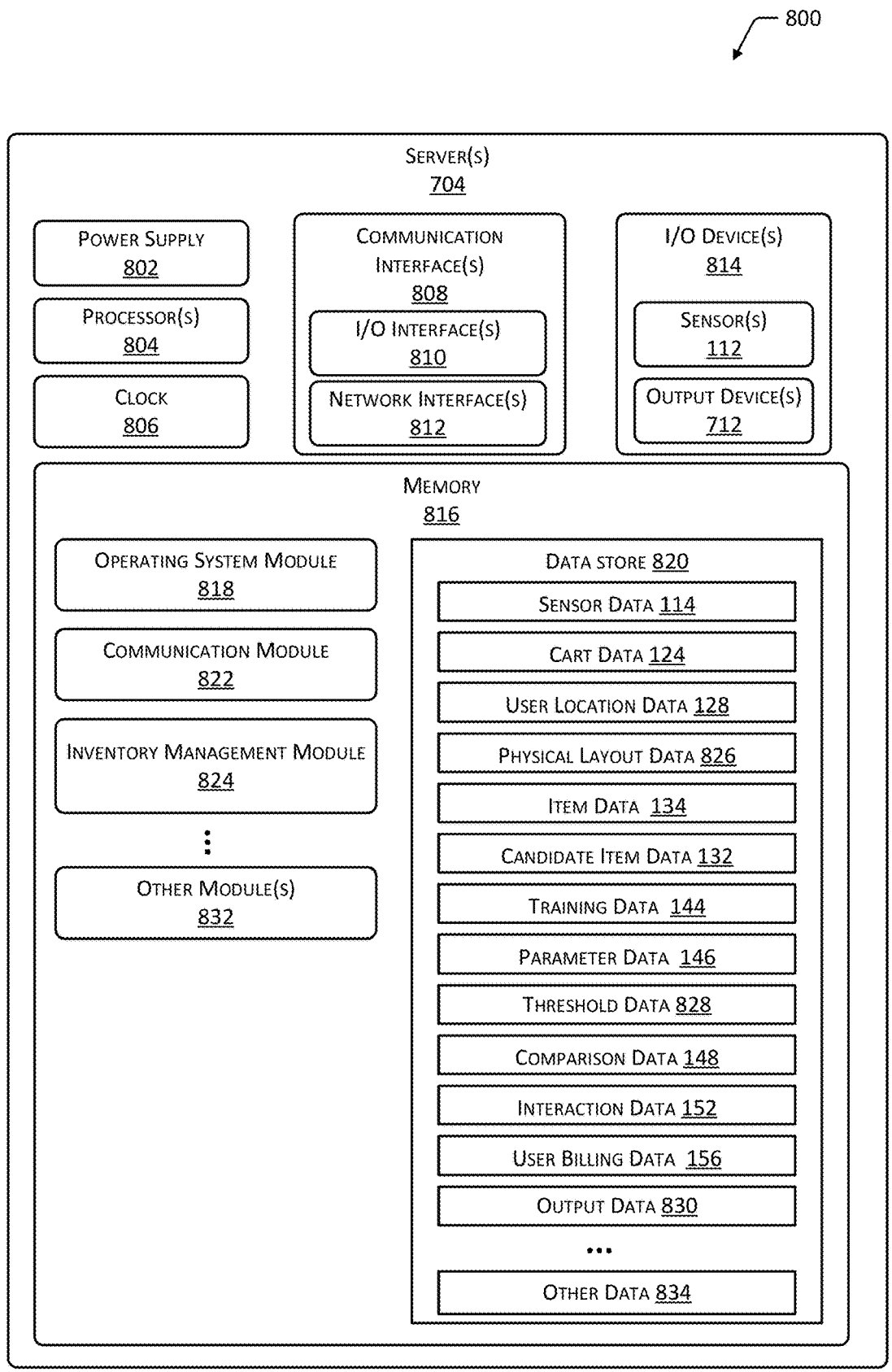
FIG. 8 is a block diagram of a server to support operation of the facility, according to some implementations.

FIG. 8 illustrates a block diagram 800 of a server 704 configured to support operation of the facility 602, according to some implementations. The server 704 may be physically present at the facility 602, may be accessible by the network 702, or a combination of both. The server 704 does not require end-user knowledge of the physical location and configuration of the system that delivers the services. Common expressions associated with the server 704 may include "on-demand computing", "software as a service (SaaS)", "platform computing", "network-accessible platform", "cloud services", "data centers", and so forth. Services provided by the server 704 may be distributed across one or more physical or virtual devices.

One or more power supplies 802 may be configured to provide electrical power suitable for operating the components in the server 704. The one or more power supplies 802 may comprise batteries, capacitors, fuel cells, photovoltaic cells, wireless power receivers, conductive couplings suitable for attachment to an external power source such as provided by an electric utility, and so forth. The server 704 may include one or more hardware processors 804 (processors) configured to execute one or more stored instructions. The processors 804 may comprise one or more cores. One or more clocks 806 may provide information indicative of date, time, ticks, and so forth. For example, the processor 804 may use data from the clock 806 to associate a particular interaction 122 with a particular point in time.

The server 704 may include one or more communication interfaces 808 such as input/output (I/O) interfaces 810, network interfaces 812, and so forth. The communication interfaces 808 enable the server 704, or components thereof, to communicate with other devices or components. The communication interfaces 808 may include one or more I/O interfaces 810. The I/O interfaces 810 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 810 may couple to one or more I/O devices 814. The I/O devices 814 may include input devices such as one or more of a sensor 112, keyboard, mouse, scanner, and so forth. The I/O devices 814 may also include output devices 712 such as one or more of a display device 712(3), printer, audio speakers, and so forth. In some embodiments, the I/O devices 814 may be physically incorporated with the server 704 or may be externally placed.

The network interfaces 812 may be configured to provide communications between the server 704 and other devices, such as the carts 110, routers, access points 710, and so forth. The network interfaces 812 may include devices configured to couple to personal area networks (PANs), local area networks (LANs), wireless local area networks (WLANS), wide area networks (WANs), and so forth. For example, the network interfaces 812 may include devices compatible with Ethernet, Wi-Fi, Bluetooth, ZigBee, and so forth.

The server 704 may also include one or more busses or other internal communications hardware or software that allow for the transfer of data between the various modules and components of the server 704.

As shown in FIG. 8, the server 704 includes one or more memories 816. The memory 816 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 816 provides storage of computer-readable instructions, data structures, program modules, and other data for the operation of the server 704. A few example functional modules are shown stored in the memory 816, although the same functionality may alternatively be implemented in hardware, firmware, or as a system on a chip (SoC).

The memory 816 may include at least one operating system (OS) module 818. The OS module 818 is configured to manage hardware resource devices such as the I/O interfaces 810, the I/O devices 814, the communication interfaces 808, and provide various services to applications or modules executing on the processors 804. The OS module 818 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

Also stored in the memory 816 may be a data store 820 and one or more of the following modules. These modules may be executed as foreground applications, background tasks, daemons, and so forth. The data store 820 may use a flat file, database, linked list, tree, executable code, script, or other data structure to store information. In some implementations, the data store 820 or a portion of the data store 820 may be distributed across one or more other devices including the servers 704, network attached storage devices, and so forth.

A communication module 822 may be configured to establish communications with one or more of the carts 110, sensors 112, display devices 712(3), other servers 704, or other devices. The communications may be authenticated, encrypted, and so forth.

The memory 816 may store an inventory management module 824. The inventory management module 824 is configured to provide the inventory functions as described herein with regard to the inventory management system 120. For example, the inventory management module 824 may track items 106 between different inventory locations 612, to and from the carts 110, determine the pairing between place and pick, and so forth. The inventory management module 824 may access sensor data 114 such as one or more of the weight data 118, image data, received data, and so forth.

Information used by the inventory management module 824 may be stored in the data store 820. For example, the data store 820 may be used to store the sensor data 114, the cart data 124, the user location data 128, the item data 134, the candidate item data 132, the training data 144, the parameter data 146, and so forth.

The inventory management module 824 may use other information during operation, such as item data 134. The item data 134 provides information about the characteristics of a particular type of item 106. These characteristics may include weight of the item 106 individually or in aggregate. For example, the item data 134 may comprise information indicative of a weight of a sample of a single item 106, or a package, kit, or other grouping considered to be a single item 106.

As mentioned previously, the item data 134 may include data about other characteristics, such as reference images 136 of the type of item 106. The sample image data may comprise one or more images of one or more of that type of item 106. For example, the reference images 136 may be obtained during processing or intake of the item 106 at the facility 602, by a manufacturer or distributor, and so forth. The item data 134 may also include other information, such as three-dimensional point cloud data for the item 106.

The item data 134 may include geometry data. The geometry data may include information indicative of size and shape of the item 106 in one, two, or three dimensions. For example, the geometry data may include the overall shape of an item 106, such as a cuboid, sphere, cylinder, and so forth. The geometry data may also include information such as length, width, depth, and so forth, of the item 106. Dimensional information in the geometry data may be measured in pixels, centimeters, inches, arbitrary units, and so forth. The geometry data may be for a single item 106, or a package, kit, or other grouping considered to be a single item 106.

The item data 134 may include an item identifier. The item identifier may be used to distinguish one type of item 106 from another. For example, the item identifier may include a stock keeping unit (SKU) string, Universal Product Code (UPC) number, and so forth. The items 106 that are of the same type may be referred to by the same item identifier. For example, cans of beef flavor Brand X dog food may be represented by the item identifier value of "9811901181". In other implementations, items 106 may each be provided with a unique item identifier, allowing each particular item 106 to be distinguished from one another.

The item data 134 may include planogram data indicative of how items 106 are to be arranged at the inventory locations 612, and so forth. The data store 820 may store other information such as physical layout data 826, threshold data 828, interaction data 152, user billing data 156, output data 830, and so forth.

The inventory management module 824 may utilize the physical layout data 826 during operation. The physical layout data 826 may provide information indicative of where cameras 112(1), weight sensors 112(2), antennas for the radio receivers 112(3), inventory locations 612, and so forth are in the facility 602 with respect to one another. For example, the physical layout data 826 may comprise information representative of a map or floor plan of the facility 602 with relative positions of inventory locations 612 and cameras 112(1).

The physical layout data 826 may associate a particular inventory location identifier (ID) or with other information such as sensor position data, sensor direction data, sensor identifiers, and so forth. The physical layout data 826 provides information about where in the facility 602 objects are, such as the inventory location 612, the sensors 112, and so forth. In some implementations, the physical layout data 826 may be relative to another object. For example, the physical layout data 826 may indicate that the weight sensor 112(2) is associated with the lane 104(1).

The inventory management module 824 may utilize this information during operation. For example, the tracking system 126 may utilize the physical layout data 826 to determine what sensor data 114 acquired from particular cameras 112(1) corresponds to a particular shelf 102, lane 104, or other inventory location 612.

The inventory management module 824 may process the sensor data 114 and generate output data 830. For example, the sensor data 114 comprises information acquired by one or more the cameras 112(1). The threshold data 828 may comprise one or more thresholds. For example, the threshold value may specify a minimum quantity value below which a restocking order is generated. The output data 830 may then comprise a restocking order.

The inventory management module 824 may determine a tidiness of the inventory location 612. For example, the inventory management module 824 may determine interaction data 152 that indicates that the user 108 has placed item 106(3) in lane 104(1), resulting in an untidy condition of lane 104(1) that is designated for storage of items 106(1). Continuing the example, the output data 830 may comprise a dispatch order for an attendant to remedy an inventory location 612 designated as untidy, such as the untidy lane.

Other modules 832 may also be present in the memory 816 as well as other data 834 in the data store 820. For example, the other modules 832 may include a restocking module.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a shelf;
   a camera having a field-of-view that includes the shelf; and
   a computing device comprising:
      a memory storing first computer-executable instructions; and
      a hardware processor to execute the first computer-executable instructions to:
         determine a location of a cart is within a first threshold distance of a first location of a user;
         determine the cart is associated with the user based on the location of the cart being within the first threshold distance of the first location of the user;
         access a first image acquired by the camera;
         determine a second location of the user is within a second threshold distance of a location of the shelf;

determine cart data, the cart data comprising data indicative of items stowed in the cart;

determine candidate item data based on the second location of the user being within the second threshold distance of the location of the shelf and based on the cart being associated with the user, the candidate item data comprising data indicative of one or more items, wherein the one or more items include the items stowed in the cart;

instantiate a neural network comprising:
  a previously trained subnetwork for each item of the one or more items, wherein the previously trained subnetwork for the each item comprises:
    a reference image for the each item;
    a feature network corresponding to the reference image for the each item; and
    a matching network for the each item;
  a test feature network; and
  an inference network;

generate, by operating the neural network, test feature data associated with the first image;

determine, by operating the neural network, reference feature data for the reference image for the each item;

generate, by operating the neural network, matching data based on the test feature data and the reference feature data for the reference image for the each item; and determine, using the matching data for the each item, comparison data indicative of a correspondence between the first image and one or more of the one or more items.

2. The system of claim 1, wherein the one or more items further include one or more of:
first items included in a shopping list associated with the user, or
second items included in a wish list associated with the user.

3. The system of claim 1, wherein the one or more items further include items that the user previously interacted with before the first image was acquired.

4. The system of claim 1, the hardware processor to further execute the first computer-executable instructions to:
determine account data associated with the user;
determine a prediction of items to be purchased by the user, based on the account data; and
wherein the one or more items further include the items predicted to be purchased by the user.

5. The system of claim 1, further comprising:
the memory storing second computer-executable instructions; and
the hardware processor to execute the second computer-executable instructions to:
  access training data comprising training images of the each item in different poses;
  instantiate a second neural network;
  train the second neural network to recognize a match between an item depicted in a test image and the each item depicted in the training images; and
  store parameter data comprising parameters of the feature network and the matching network for the previously trained subnetwork for the each item.

6. The system of claim 1, further comprising:
the memory storing second computer-executable instructions; and
the hardware processor to execute the second computer-executable instructions to:
  instantiate a multi-layer perceptron for the each item, wherein every instantiation of the multi-layer perceptron uses a same set of one or more predetermined parameters; and
  process, with a respective multi-layer perceptron, the reference feature data of the each item to generate the matching data for the each item.

7. A method comprising:
determining a location of a cart is within a first threshold distance of a first location of a user;
determining the cart is associated with the user based on the location of the cart being within the first threshold distance of the first location of the user;
accessing a first image;
determining the first image is associated with an inventory location;
determining a second location of the user is within a second threshold distance of the inventory location;
determining cart data, the cart data comprising data indicative of items stowed in the cart;
determining candidate item data based on the second location of the user being within the second threshold distance of the inventory location and based on the cart being associated with the user, the candidate item data comprising data indicative of one or more items associated with the user, wherein the one or more items associated with the user include the items stowed in the cart;
instantiating a neural network comprising:
  a previously trained subnetwork for each item of the one or more items, wherein the previously trained subnetwork for the each item comprises:
    a reference image for the each item;
    a feature network corresponding to the reference image for the each item; and
    a matching network for the each item;
  a test feature network; and
  an inference network;
generating, using the neural network, test feature data associated with the first image;
generating, using the neural network, matching data based on the test feature data and reference feature data associated with the each item; and
determining, using the matching data for the each item, comparison data indicative of a correspondence between the first image and at least one of the one or more items.

8. The method of claim 7, further comprising:
determining a shopping list of items associated with the user; and
designating the items in the shopping list as candidate items.

9. The method of claim 7, further comprising:
determining items previously purchased by the user; and
designating the items previously purchased by the user as candidate items.

10. The method of claim 7, further comprising:
accessing account data associated with the user;
determining a prediction of items to be purchased by the user, based on the account data; and
designating the items predicted to be purchased by the user as candidate items.

11. The method of claim 7, further comprising:
determining items designated for stowage at the inventory location; and
designating the items designated for stowage at the inventory location as candidate items.

12. A system comprising:
a computing device comprising:
- a memory storing first computer-executable instructions; and
- a hardware processor to execute the first computer-executable instructions to:
  - determine a location of a cart is within a first threshold distance of a first location of a user;
  - determine the cart is associated with the user based on the location of the cart being within the first threshold distance of the first location of the user;
  - access a first image acquired by a camera;
  - determine the first image is associated with an inventory location;
  - determine a second location of the user is within a second threshold distance of the inventory location;
  - determine cart data indicative of items stowed in the cart;
  - determine candidate item data based on the second location of the user being within the second threshold distance of the inventory location and based on the cart being associated with the user, the candidate item data comprising data indicative of one or more items associated with the user, wherein the one or more items include the items stowed in the cart;
  - instantiate a neural network comprising:
    - a previously trained subnetwork for each item of the one or more items, wherein the previously trained subnetwork for the each item comprises:
      - a reference image for the each item;
      - a feature network corresponding to the reference image for the each item; and
      - a matching network for the each item;
    - a test feature network; and
    - an inference network;
  - determine, by operating the neural network, test feature data associated with the first image;
  - determine, by operating the neural network, reference feature data for the reference image for the each item;
  - generate, by operating the neural network, matching data based on the test feature data and the reference feature data for the reference image for the each item; and
  - determine, using the matching data for the each item, comparison data indicative of a correspondence between the first image and one or more of the one or more items.

13. The system of claim 12, the hardware processor to further execute the first computer-executable instructions to:
- determine that an item depicted in the first image matches an item depicted in one of the reference images, based on the comparison data.

14. The system of claim 12, the hardware processor to further execute the first computer-executable instructions to:
- access account data associated with the user;
- determine a prediction of items to be purchased by the user, based on the account data; and
- wherein the one or more items further include the items predicted to be purchased by the user.

15. The system of claim 12, wherein the previously trained subnetwork for the each item comprises a convolutional neural network with a residual network architecture in which one or more predetermined parameters are identical for each instantiation.

* * * * *